(12) United States Patent
Choi et al.

(10) Patent No.: US 10,798,548 B2
(45) Date of Patent: Oct. 6, 2020

(54) METHOD FOR CONTROLLING DEVICE BY USING BLUETOOTH TECHNOLOGY, AND APPARATUS

(71) Applicant: LG ELECTRONICS INC., Seoul (KR)

(72) Inventors: Jingu Choi, Seoul (KR); Taeyoung Song, Seoul (KR); Minsoo Lee, Seoul (KR); Jinkwon Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/327,251

(22) PCT Filed: Aug. 17, 2017

(86) PCT No.: PCT/KR2017/008967
§ 371 (c)(1),
(2) Date: Feb. 21, 2019

(87) PCT Pub. No.: WO2018/038459
PCT Pub. Date: Mar. 1, 2018

(65) Prior Publication Data
US 2019/0215673 A1    Jul. 11, 2019

Related U.S. Application Data

(60) Provisional application No. 62/377,683, filed on Aug. 22, 2016.

(51) Int. Cl.
*H04W 4/80* (2018.01)
*H04W 12/08* (2009.01)
(Continued)

(52) U.S. Cl.
CPC .............. *H04W 4/80* (2018.02); *G08C 17/02* (2013.01); *H04L 47/20* (2013.01); *H04Q 9/04* (2013.01);
(Continued)

(58) Field of Classification Search
CPC ........... G08C 2201/31; G08C 2201/42; H04W 48/16; H04W 8/005; H04W 4/80; H04W 88/16
See application file for complete search history.

(56) References Cited

U.S. PATENT DOCUMENTS 5,113,325 A * 5/1992 Eisenbraun .......... A41D 27/085
362/103
5,845,987 A * 12/1998 Painter .................. A42B 1/242
362/206
(Continued)

FOREIGN PATENT DOCUMENTS

KR    10-2014-0079328 A    6/2014
WO    WO 2015/069030 A1    5/2015
(Continued)

*Primary Examiner* — Devan A Sandiford
(74) *Attorney, Agent, or Firm* — Birch, Stewart, Kolasch & Birch, LLP

(57) ABSTRACT

The present invention relates to a method by which a user device controls a target device by using Bluetooth low energy technology in a wireless communication system, and an apparatus. According to the present invention, provided are a method and an apparatus for: discovering a first gateway for controlling at least one target device through a voice signal; receiving a first voice signal for controlling the at least one target device from a user; transmitting user information for identifying the user and the first voice signal to the searched for first gateway; and receiving, from the first gateway, a second voice signal or data indicating a control result with respect to the first voice signal.

17 Claims, 27 Drawing Sheets

(51) Int. Cl.
*H04W 4/00* (2018.01)
*G08C 17/02* (2006.01)
*H04W 36/08* (2009.01)
*H04Q 9/04* (2006.01)
*H04W 48/16* (2009.01)
*H04L 12/813* (2013.01)
*H04W 88/16* (2009.01)

(52) U.S. Cl.
CPC ............ *H04W 4/00* (2013.01); *H04W 12/08* (2013.01); *H04W 36/08* (2013.01); *H04W 48/16* (2013.01); *G08C 2201/31* (2013.01); *G08C 2201/42* (2013.01); *H04W 88/16* (2013.01); *Y02D 70/00* (2018.01); *Y02D 70/10* (2018.01); *Y02D 70/14* (2018.01)

(56) References Cited

U.S. PATENT DOCUMENTS

| | | | | |
|---|---|---|---|---|
| 8,491,145 B2 * | 7/2013 | Waters | .................... | A42B 1/244 2/209.13 |
| 8,550,651 B2 * | 10/2013 | Waters | .................... | A42B 1/244 2/209.13 |
| 8,757,831 B2 * | 6/2014 | Waters | .................... | A42B 1/244 362/106 |
| 9,489,016 B2 * | 11/2016 | Malek | .................... | G06F 1/163 |
| 10,159,294 B2 * | 12/2018 | Waters | .................... | A42B 1/244 |
| 10,171,719 B1 * | 1/2019 | Fitzgerald | .............. | A42B 1/006 |
| 10,219,562 B2 * | 3/2019 | Campbell | .............. | A42B 1/242 |
| 2004/0203387 A1 * | 10/2004 | Grannan | ................ | G08C 17/00 455/41.2 |
| 2008/0130272 A1 * | 6/2008 | Waters | .................... | G02C 11/04 362/106 |
| 2014/0046664 A1 | 2/2014 | Sarkar et al. | | |
| 2014/0167931 A1 * | 6/2014 | Lee | ..................... | H04L 12/2818 340/12.5 |
| 2015/0245369 A1 * | 8/2015 | Heydon | ................ | H04W 84/18 370/329 |
| 2016/0073259 A1 * | 3/2016 | Lee | ..................... | G06F 3/04842 715/734 |
| 2016/0360345 A1 * | 12/2016 | Kim | ....................... | H04W 76/14 |
| 2017/0006415 A1 * | 1/2017 | Song | ........................ | H04W 4/80 |
| 2017/0034646 A1 * | 2/2017 | Song | ........................ | H04W 8/005 |
| 2017/0078836 A1 * | 3/2017 | Song | ........................ | H04W 4/80 |
| 2017/0171798 A1 * | 6/2017 | Song | ........................ | H04W 48/12 |
| 2017/0251469 A1 * | 8/2017 | Lee | ............................ | H04L 1/16 |
| 2017/0303076 A1 * | 10/2017 | Song | ........................ | H04L 1/1877 |
| 2019/0013960 A1 * | 1/2019 | Sadwick | .............. | H04L 12/2816 |
| 2019/0020493 A1 * | 1/2019 | Arling | .................... | G08C 17/02 |
| 2019/0215879 A1 * | 7/2019 | Song | ........................ | H04W 4/80 |
| 2019/0349718 A1 * | 11/2019 | Kwon | .................... | H04W 76/15 |

FOREIGN PATENT DOCUMENTS

| | | |
|---|---|---|
| WO | WO 2016/003064 A1 | 1/2016 |
| WO | WO 2016/017909 A1 | 2/2016 |

\* cited by examiner

METHOD FOR CONTROLLING DEVICE BY USING BLUETOOTH TECHNOLOGY, AND APPARATUS

CROSS REFERENCE TO RELATED APPLICATIONS

This application is the National Phase of PCT International Application No. PCT/KR2017/008967, filed on Aug. 17, 2017, which claims priority under 35 U.S.C. 119(e) to U.S. Provisional Application No. 62/377,683, filed on Aug. 22, 2016, all of which are hereby expressly incorporated by reference into the present application.

TECHNICAL FIELD

The present invention relates to a method and apparatus for controlling a device using Bluetooth, that is, a short-distance technology, in a wireless communication system and, more particularly, to a method and apparatus for controlling a target device through audio or voice information using the Bluetooth technology.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

An object of the present invention is to provide a method and apparatus for transmitting audio data and voice data using the Bluetooth technology.

Furthermore, an object of the present invention is to provide a method and apparatus for controlling a target device through a user's voice.

Furthermore, an object of the present invention is to provide a method and apparatus for recognizing a user's voice, discovering a gateway for controlling target devices based on the recognized voice, and transmitting a voice command to the target devices through a discovered gateway.

Furthermore, an object of the present invention is to provide a method and apparatus for proposing control of a target device according to a user's authority.

Furthermore, an object of the present invention is to provide a method and apparatus for the handover of Bluetooth for providing a continuous voice recognition service when a user's device moves.

Technical objects to be achieved in this specification are not limited to the aforementioned object, and those skilled in the art to which the present invention pertains may evidently understand other technological objects from the following description.

Technical Solution

The present invention provides a method and apparatus for enabling a user device to control a target device using a Bluetooth low energy technology in a wireless communication system.

Specifically, a method of controlling a target device by a user device according to an embodiment of the present invention includes discovering a first gateway for controlling at least one target device through a voice signal; receiving, from a user, a first voice signal for controlling the at least one target device; transmitting, to the discovered first gateway, user information for identifying the user and the first voice signal, wherein the user information is transmitted through a data channel for transmitting and receiving data and the voice signal is transmitted through a first isochronous channel for transmitting and receiving audio signals; and receiving, from the first gateway, data indicating a result of control of the first voice signal or a second voice signal.

Furthermore, in the present invention, discovering the first gateway includes receiving an advertising message from an at least one adjacent gateway; transmitting, to the first gateway supporting voice recognition among the at least one gateway, a request message to request control of a target device through a voice signal based on the advertising message; and opening the first isochronous channel with the first gateway. The advertising message includes a specific field indicating whether the at least one gateway supports voice recognition.

Furthermore, in the present invention, discovering the first gateway includes broadcasting a request message to request control of a target device through a voice signal; receiving a response message as a response to the request message from the first gateway; and opening the first isochronous channel with the first gateway.

Furthermore, the present invention further includes registering the user device with the first gateway and transmitting, to the first gateway, the user information including a user name.

Furthermore, the present invention further includes receiving, from the first gateway, a message including at least one of group information of a group formed by the at least one target device, a group name, a group address, state information indicating a state of each target device, or security information according to a control authority of the user device.

Furthermore, the present invention further includes transmitting, to the first gateway, a request message to request policy information according to a control authority of the user device; and receiving, from the first gateway, a response message including the policy information. The policy information indicates a control range of the at least one target device according to the control authority.

Furthermore, the present invention further includes checking link quality of the first gateway and a second gateway; receiving, from the first gateway, an indication message indicating handover to the second gateway based on the link quality; synchronizing the second gateway in order to form a second isochronous channel with the second gateway; transmitting, to the second gateway, a confirm message in order to indicate that the second gateway has been synchronized; and opening the second isochronous channel with the second gateway.

Furthermore, the present invention provides a method of delivering a voice signal by a gateway using a Bluetooth low energy technology in a wireless communication system, including performing a discovery procedure for discovering the gateway by a user device; receiving, from the user device, user information for identifying a user and a first voice signal for controlling at least one target device, wherein the user information is received through a data channel for transmitting and receiving data and the voice signal is received through a first isochronous channel for transmitting and receiving audio signals; transmitting the user information and the first voice signal to a voice recognition server capable of processing a voice signal; receiving, from the voice recognition server, control information indicating a specific operation corresponding to the first voice signal and authority information indicating a user authority corresponding to the user information; and determining whether to indicate the specific operation with respect to the at least one target device based on the authority information.

Furthermore, the present invention further includes transmitting, to the user device, a notification message indicating control impossibility when the authority information indicates an authority incapable of indicating the specific operation.

Furthermore, the present invention further includes transmitting, to the at least one target device, a request message to request the specific operation when the authority information indicates an authority capable of indicating the specific operation; receiving, from the at least one target device, a response message indicating a result of execution of the specific operation; and transmitting, to the user device, data indicating a result of the first voice signal or a second voice signal.

Furthermore, the present invention further includes transmitting, to the user device, time information indicating an estimated operation time of the at least one target device for the specific operation.

Furthermore, the present invention further includes registering the gateway with the voice recognition server; registering the user device with the gateway; receiving, from the user device, the user information including a user name and transmitting the user information to the voice recognition server.

Furthermore, the present invention further includes checking link quality between the user device and the gateway; determining handover of the user device to a target gateway based on the link quality; transmitting, to the target gateway, a request message to request the handover of the user device, wherein the handover request message includes at least one of gateway information indicating at least one gateway used by the user device or security information of the user device; receiving, from the target gateway, a handover response message as a response to the handover request message; transmitting, to the user device, an indication message indicating the handover to the target gateway; and receiving, from the target gateway, a release message indicating the completion of the handover.

Furthermore, the present invention provides a user device controlling a target device using a Bluetooth low energy technology in a wireless communication system, including a communication unit for communicating with the outside in a wired or wireless manner and a processor functionally connected to the communication unit. The processor is configured to discover a first gateway for controlling at least one target device through a voice signal; receive, from a user, a first voice signal for controlling the at least one target device; transmit, to the discovered first gateway, user information for identifying the user and the first voice signal, wherein the user information is transmitted through a data channel for transmitting and receiving data and the voice signal is transmitted through a first isochronous channel for transmitting and receiving audio signals; and receive, from the first gateway, data indicating a result of control of the first voice signal or a second voice signal.

Advantageous Effects

In accordance with the method for transmitting and receiving data using the Bluetooth technology according to an embodiment of the present invention, there is an effect in that a voice recognition service can be provided through the transmission and reception of voice data and audio data.

Furthermore, according to the present invention, there is an effect in that multiple target devices configuring a network can be controlled at a remote distance through a voice signal.

Furthermore, according to the present invention, there is an effect in that the range in which a target device can be controlled can be limited depending on a user by configuring authority for controlling a target device for each user.

Furthermore, according to the present invention, there is an effect in that services can continue to be provided by performing handover for changing a gateway for controlling a target device when a device moves as a user moves.

Effects which may be obtained in this specification are not limited to the aforementioned effects, and various other effects may be evidently understood by those skilled in the art to which the present invention pertains from the following description.

DESCRIPTION OF DRAWINGS

The accompany drawings, which are included as part of the detailed description in order to help understanding of the present invention, provide embodiments of the present invention and describe the technical characteristics of the present invention along with the detailed description.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
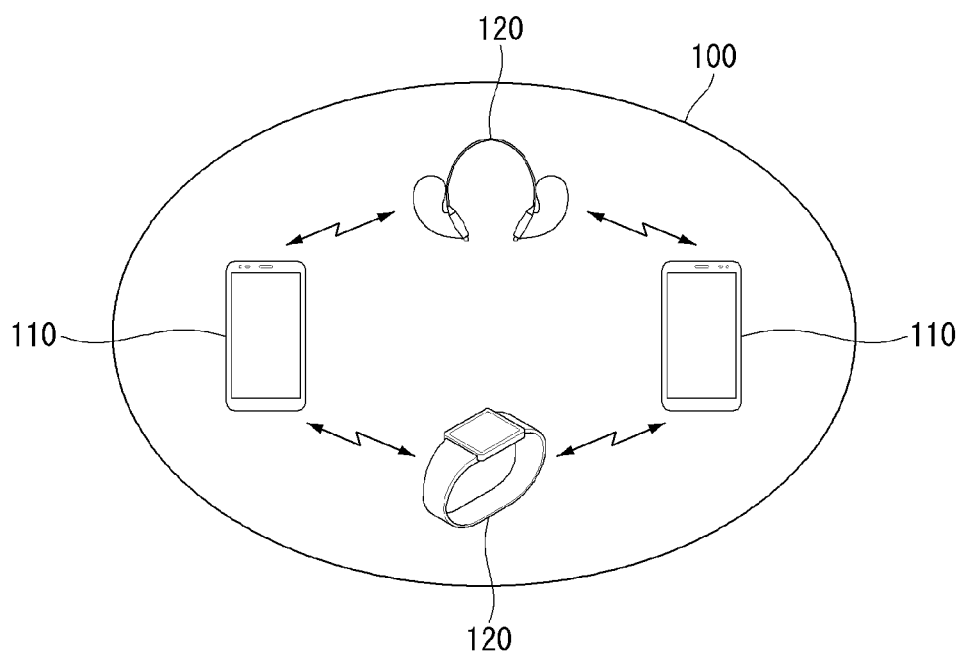
FIG. 1 is a schematic view illustrating an example of a wireless communication system using a Bluetooth low energy technology, which is proposed in this specification.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device or the like.

The client device 110 may be expressed as a master device, a master, a client, a member, a sensor device, a sink device, a collector, a third device, a fourth device or the like.

The server device and the client device correspond to major elements of the wireless communication system. The wireless communication system may include different elements other than the server device and the client device.

The server device refers to a device, which receives data from the client device, directly performs communication with the client device, and provides data to the client device through a response when it receives a data request from the client device.

Furthermore, the server device transmits a notification message, an indication message to the client device in order to provide the client device with data information. Furthermore, the server device receives a confirm message, corresponding to an indication message, from the client device when it transmits the indication message to the client device.

Furthermore, the server device may provide data information to a user through a display unit and receive a request input by the user through a user input interface in a process of transmitting and receiving notification, indication, confirm messages to and from the client device.

Furthermore, the server device may read data from a memory unit or write new data in corresponding memory in a process of transmitting and receiving messages to and from the client device.

Furthermore, one server device may be connected to multiple client devices and may be easily re-connected (or accessed) to client devices using bonding information.

The client device 120 refers to a device which requests data information and data transmission from a server device.

The client device receives data from the server device through a notification message, an indication message, etc., and transmits a confirm message as a response to an indication message when it receives the indication message from the server device.

Likewise, the client device may provide information to a user through a display unit or receive input from the user through a user input interface in a process of transmitting and receiving messages to and from the server device.

Furthermore, the client device may read data from memory or write new data in corresponding memory in a process of transmitting and receiving messages to and from the server device.

Figure 2:
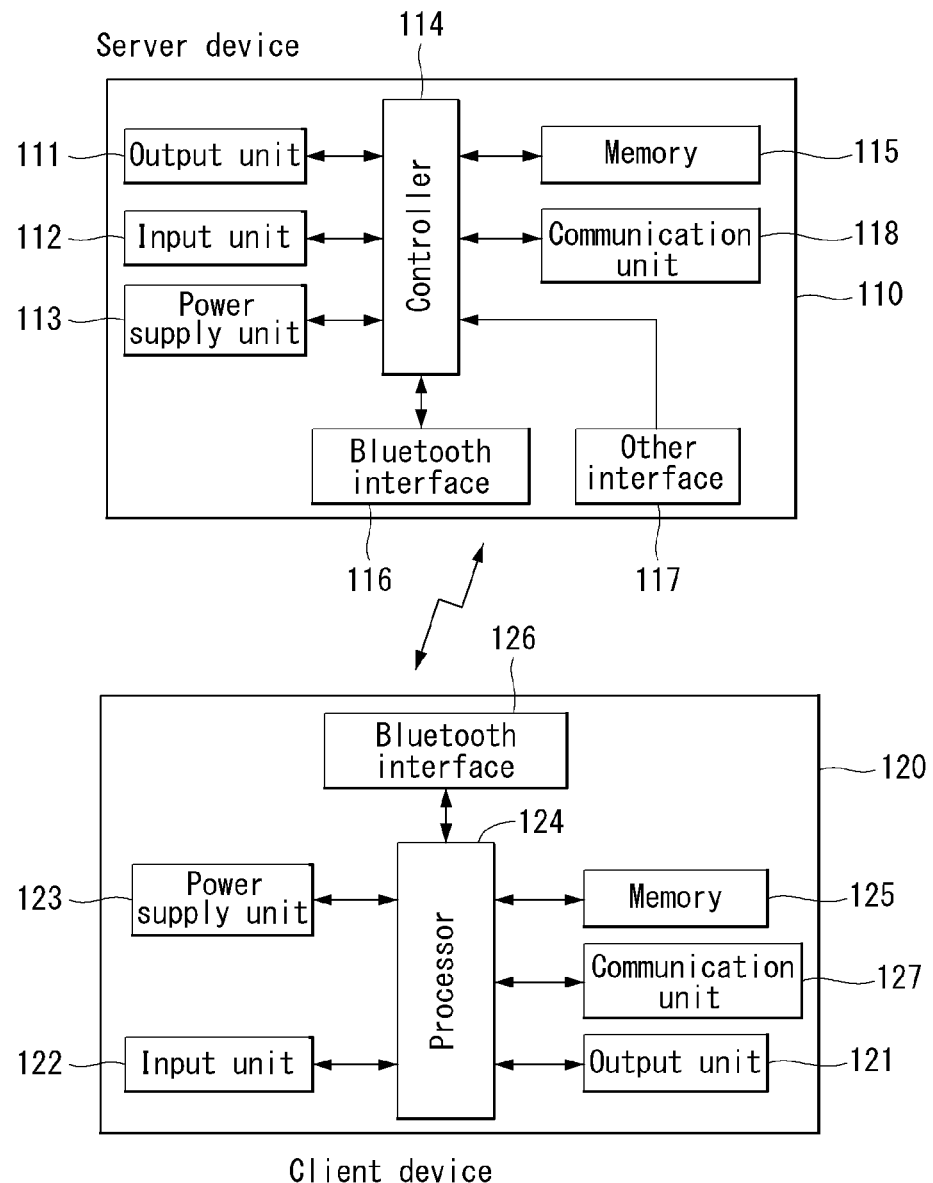
FIG. 2 shows an example of an internal block diagram of a device capable of implementing methods proposed in this specification.

Hardware elements, such as the display unit, user input interface and memory of the server device and the client device are described specifically in FIG. 2.

Furthermore, the wireless communication system may configure personal area networking (PAN) through a Bluetooth technology. For example, in the wireless communication system, files, documents, etc. can be exchanged rapidly and safely by establishing a private piconet between devices.

FIG. 2 shows an example of an internal block diagram of a device capable of implementing methods proposed in this specification.

As shown in FIG. 2, the server device includes a display unit 11*l*, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present invention.

Furthermore, the client device includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present invention.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device or the client device, and controls the server device or the client device in order in order to request the transmission of a message through the Bluetooth interface or other interface and to process a received message.

The processor 114, 124 may be represented by a controller or a control unit.

The processor 114, 124 may include application-specific integrated circuits (ASICs), other chipsets, logical circuits and/or data processing devices.

The processor 114, 124 controls the communication unit so that it receives an advertising message from a server device, controls the communication unit so that it transmits a scan request message to the server device and receives a scan reply message from the server device as a response to the scan request, and controls the communication unit so that it transmits a connection request message to the server device for a Bluetooth connection configuration with the server device.

Furthermore, the processor 114, 124 controls the communication unit so that it reads or writes data using an attribute protocol from the server device after a Bluetooth LE connection is established through the connection procedure.

The memory 115, 125 may include read-only memory (ROM), random access memory (RAM), flash memory, a memory card, a storage medium and/or other storage devices.

The communication unit 118, 127 may include a baseband circuit for processing a radio signal. If an embodiment is implemented in the form of software, the aforementioned method may be implemented by a module (process or function) which performs the aforementioned function. The module is stored in the memory and is performed by the processor.

The memory 115, 125 may be installed inside or outside the processor 114, 124 and may be connected to the processor 114, 124 through various well-known means.

The display unit 111, 121 refers to a module for providing status information about a device and message exchange information to a user through a display.

The power supply unit 113, 123 refers to a module for receiving external or internal power under the control of the controller and for supplying power for the operation of each element.

As described above, the BLE technology has a small duty cycle and can significantly reduce power consumption through a low-speed data transmission rate.

The user input interface 112, 122 refers to a module which provides a user's input to the controller along with a screen button so that the user can control an operation of the device.

Figure 3:
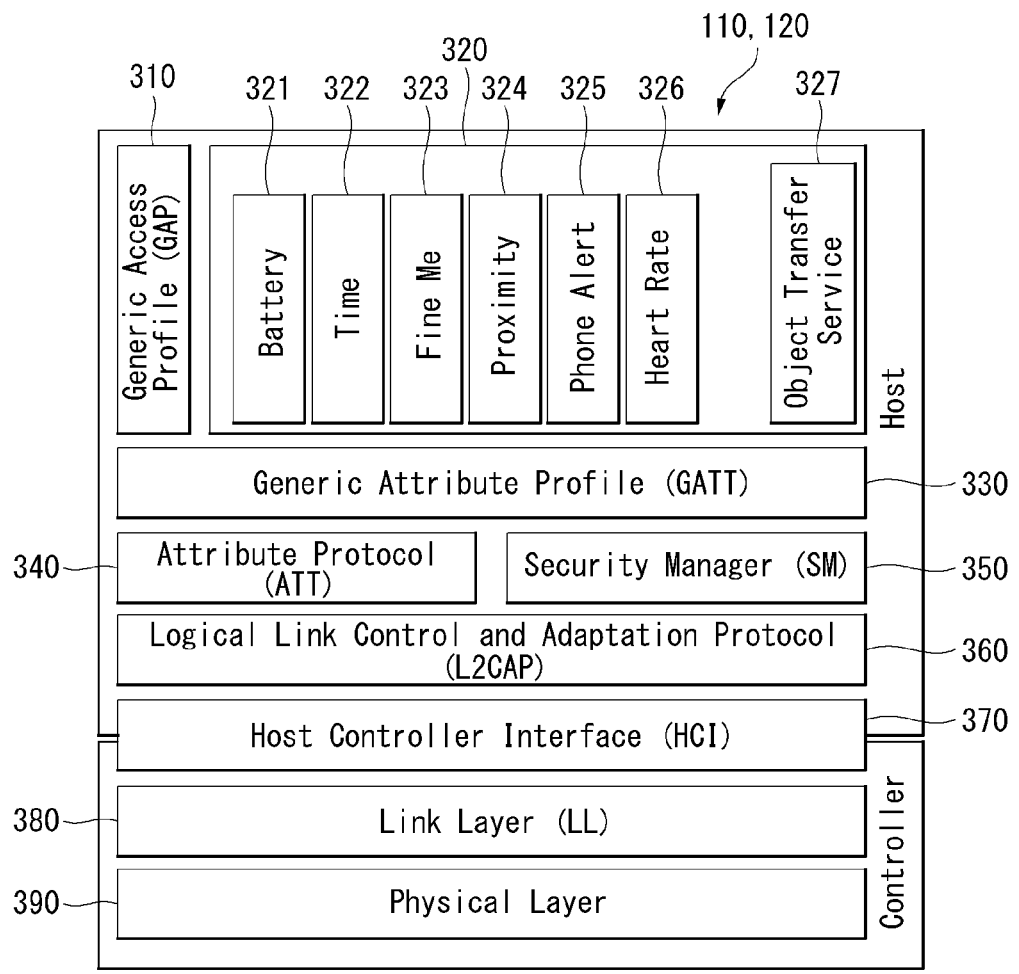
FIG. 3 shows an example of Bluetooth communication architecture to which methods proposed in this specification may be applied.

FIG. 3 shows an example of Bluetooth communication architecture to which methods proposed in this specification may be applied.

Specifically, FIG. 3 shows an example of Bluetooth low energy (LE) architecture.

Figure 5:
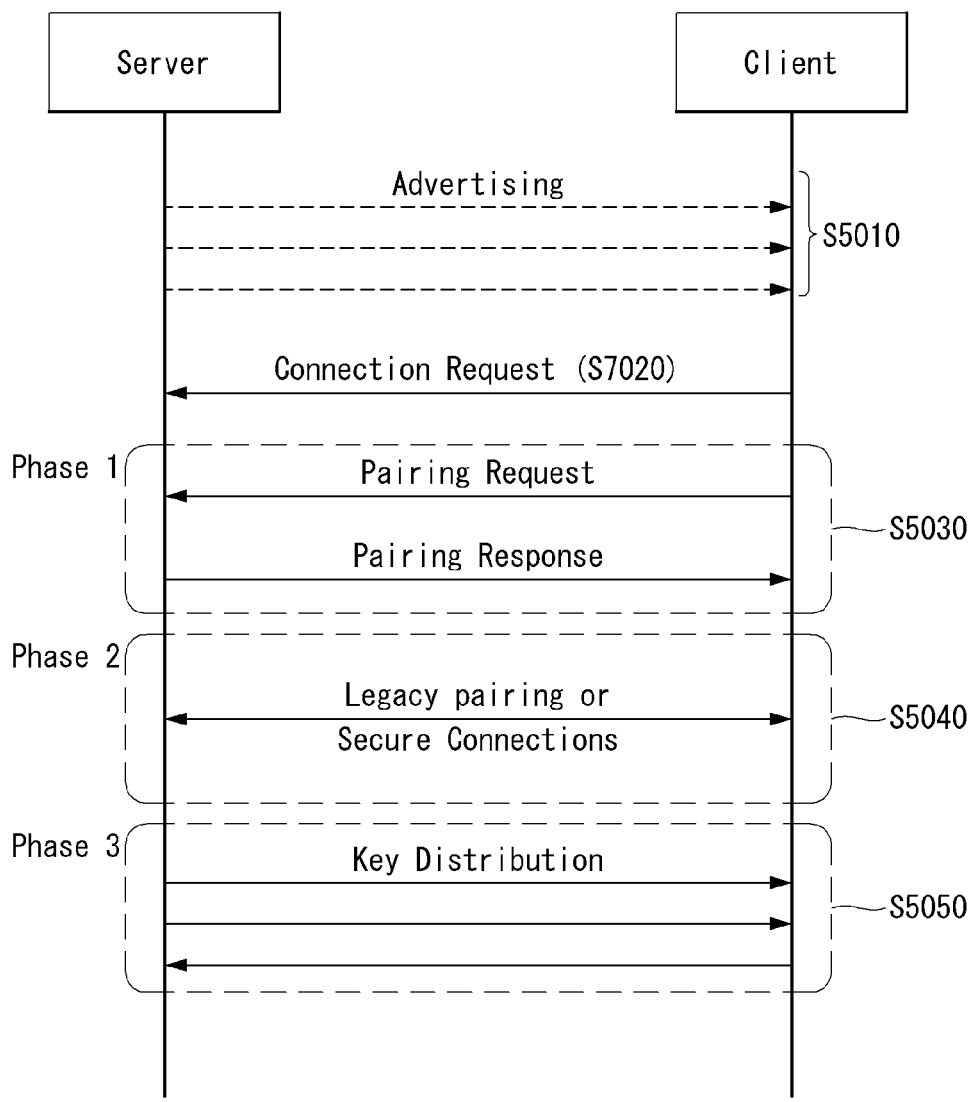
FIG. 5 is a flowchart showing an example of a connection procedure method in a Bluetooth low energy technology to which the present invention may be applied.

As shown in FIG. 5, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth specification using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

That is, ① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The GAP is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: It provides an alarm service according to the distance.

Proximity: A method for exchanging battery information.

Time: Time information exchange method

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption can be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices can scan the discoverable device through an advertising (or broadcast) physical channel.

Both of the discovering device and the discoverable device may already have been connected to other Bluetooth devices in a piconet.

Connecting Procedure

A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters the connection state when a device makes a connection request, that is, an initiating device sends a CONNECT_REQ PDU to an advertising device or the advertising device receives a CONNECT_REQ PDU from the initiating device.

Establishing a connection may be taken into consideration after the link layer enters the connection state. However, establishing a connection when the link layer enters the connection state may not need to be taken into consideration. The only difference between a newly created connection and an existing connection is a supervision timeout value for a link layer connection.

When two devices are connected to each other, they play respective different roles.

A link layer playing the role of a master is called a master device, whereas a link layer playing the role of a slave is called a slave device. A master device adjusts timing of a connection event. In this case, the connection event denotes the time when the mast device and a slave device are synchronized.

Hereinafter, packets defined in a Bluetooth interface are described in brief. BLE devices use the following defined packets.

Packet Format

The link layer has only one packet format used for both an advertising channel packet and a data channel packet.

Each of the packets includes four fields: a preamble, an access address, a PDU, and CRC.

If one packet is transmitted through an advertising physical channel, the PDU may function as an advertising channel PDU. If one packet is transmitted through a data physical channel, the PDU may function as a data channel PDU.

Advertising Channel PDU

The advertising channel PDU includes a 16 bit header and a payload of various sizes.

The PDU type filed of an advertising channel included in the header supports PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU includes a 16 bit header and a payload of various sizes, and may include a Message Integrity Check (MIC) field.

The procedures, statuses, and packet formats of the BLE technology described above may be applied to perform methods according to embodiments of the present invention.

Figure 4:
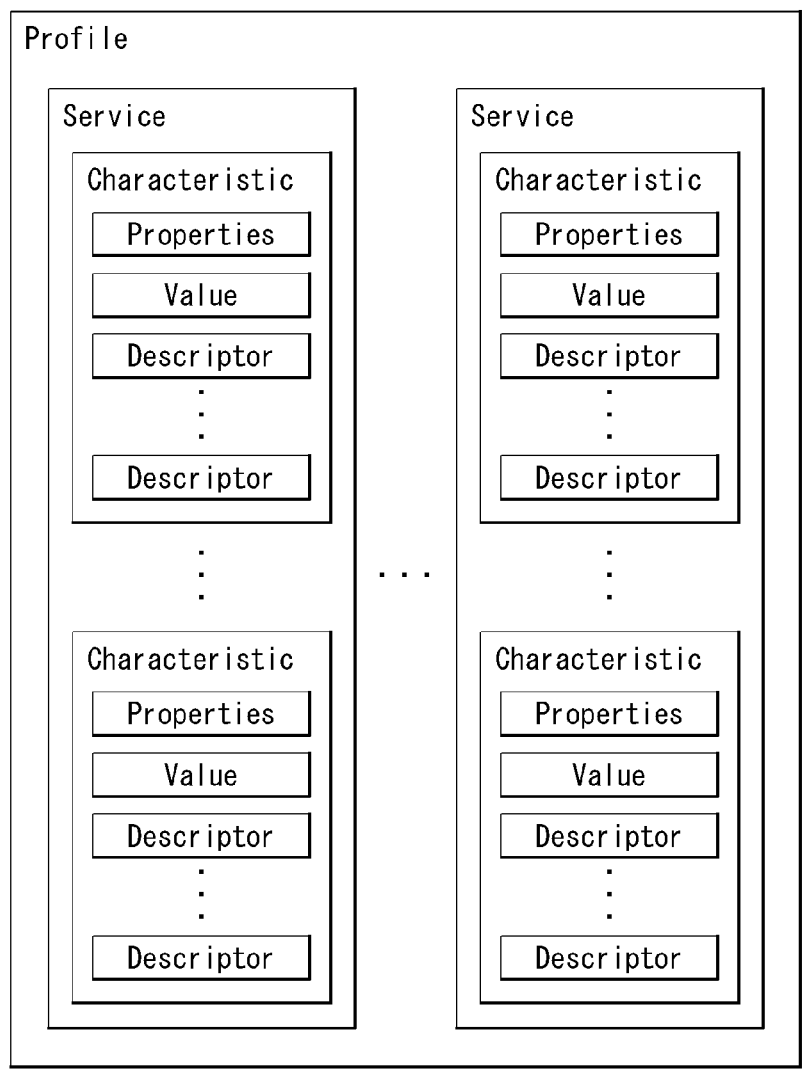
FIG. 4 shows an example of the structure of a generic attribute profile (GATT) of Bluetooth low energy.

FIG. 4 shows an example of the structure of a generic attribute profile (GATT) of Bluetooth low energy.

From FIG. 4, a structure for the profile data exchange of Bluetooth low energy may be seen.

Specifically, the generic attribute profile (GATT) defines a method of exchanging data using services and characteristics between Bluetooth LE devices.

In general, a peripheral device (e.g., a sensor device) functions as a GATT server and has definition for services, characteristics. A central device functions as a GATT client.

In order to read or write data, a GATT client transmits a data request to a GATT server. All transactions start at the GATT client, and a response is received from the GATT server.

A GATT-based operation structure used in Bluetooth LE is based on a profile, service, characteristic, and may establish a vertical structure, such as FIG. 4.

The profile is configured with one or more services. The service may be configured with one or more characteristics or other services.

The service functions to divide data in a logical unit, and may include one or more characteristics or other services. Each service has an identifier of 16 bits or 128 bits, which is called a universal unique identifier (UUID).

The characteristic is the lowest unit in the GATT-based operation structure. The characteristic includes only one datum and has a UUID of 16 bits or 128 bits similar to the service.

The characteristic is defined as values of several pieces of information, and requires one attribute in order to contain each piece of information. The characteristic may use several continued attributes.

The attribute is configured with four elements and has the following meanings.

handle: Address of attribute
Type: Type of attribute
Value: Value of attribute
Permission: Access authority for attribute FIG. 5 is a flowchart showing an example of a connection procedure method in a Bluetooth low energy technology to which the present invention may be applied.

A server transmits an advertising message to a client through three advertising channels (S5010).

The server may be called an advertiser prior to a connection, and may be called a master after a connection. The server may be a sensor (temperature sensor, etc.), for example.

Furthermore, the client may be called a scanner prior to a connection and may be called a slave after a connection. The client may be a smartphone, for example.

As described above, Bluetooth is divided into a total of 40 channels and performs communication through a 2.4 GHz band. The three channels of the 40 channels are advertising channels and are used for the exchange of packets exchanged in order to establish a connection, including various advertising packets.

The remaining 37 channels are data channels and used for a data exchange after a connection.

After the client receives the advertising message, it may transmit a Scan Request message to the server in order to obtain additional data (e.g., a server device name).

In this case, the server transmits a Scan Response message, including the additional data, to the client as a response to the Scan Request message.

In this case, the Scan Request message and the Scan Response message are one type of advertising packet. The advertising packet may include only user data of 31 bytes or less.

Accordingly, if the size of data is greater than 3 bytes, but there is data having great overhead in transmitting the data after a connection is established, the data is transmitted in twice using a Scan Request message/Scan Response message.

Next, the client transmits, to the server, a Connection Request message for a Bluetooth connection configuration with the server (S5020).

Accordingly, a link layer (LL) connection is established between the server and the client.

Thereafter, the server and the client perform a security establishment procedure.

The security establishment procedure may be interpreted as secure simple pairing or may be performed, including the secure simple pairing.

That is, the security establishment procedure may be performed through Phase 1 step to Phase 3 step.

Specifically, a pairing procedure (Phase 1) is performed between the server and the client (S5030).

In the pairing procedure, the client transmits a Pairing Request message to the server, and the server transmits a Pairing Response message to the client.

Authentication requirements, input (I)/output (O) capabilities and Key size information are exchanged through the pairing procedure. Which key generation method will be used is determined based on the information through Phase 2.

Next, in Phase 2, legacy pairing or secure connections are performed between the server and the client (S5040).

In Phase 2, a temporary key and short term key (STK) of 128 bits that performs legacy pairing is generated.

Temporary Key: key produced to generate an STK
Short Term Key (STK): key value used to produce an encrypted connection between devices If secure connections are performed in Phase 2, a long term key (LTK) of 128 bits is generated.

Long Term Key (LTK): key value used in subsequent connections in addition to encrypted connections between devices Next, in SSP Phase 3, a key distribution procedure is performed between the server and the client (S5050).

Accordingly, a secure connection is established between the server and the client and an encrypted link is established therebetween, so data can be transmitted and received.

Overview of Isochronous Channel

Figure 6:
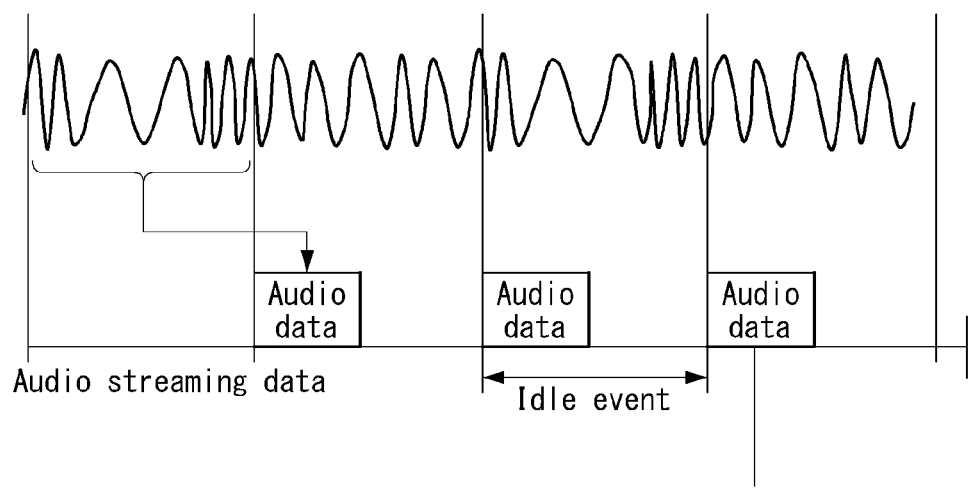
FIG. 6 is a diagram showing the characteristic of an audio signal.

FIG. 6 shows characteristics of an audio signal.

As shown in FIG. 6, in the case of an audio signal, audio streaming data or audio data is periodically generated at an idle event interval.

Audio data is generated periodically (or at a specific time interval) according to the characteristics thereof.

In this case, the specific time interval during which audio data is periodically generated may be represented as an idle event interval.

Audio data is transmitted at an individual idle event interval.

Furthermore, individual audio data may be transmitted throughout part of or the entire event interval.

As shown in FIG. 6, when audio streaming data generated periodically or regularly is transmitted according to the BLE mechanism, an advertisement and scanning procedure, a communication procedure, and a disconnection procedure have to be performed whenever the generated audio data is transmitted or received.

As shown in FIG. 6, however, since audio data is generated at a regular interval for most cases, latency needs to be guaranteed with respect to the transmission of the audio data regardless of the amount of the audio data.

If the advertisement and scanning procedure, the communication procedure, and the disconnection procedure are performed whenever newly generated audio data is transmitted, however, a latency problem occurs during the transmission of the audio data.

If the BLE technology rather than the Bluetooth BE/EDR technology is used, high energy efficiency can be achieved because a relatively small amount of audio data is transmitted through an HA or headset. As described above, however, great overhead is generated because the data channel process of the BLE technology involves advertising, connection, etc. whenever data is transmitted. Accordingly, latency absolutely required for the transmission of audio data cannot be guaranteed.

Furthermore, the data channel process of the BLE technology involves sending intermittently generated data only when necessary, thereby improving energy efficiency by leading a BLE device in a different time region to deep sleep.

Therefore, it may be difficult to apply the data channel process of the BLE technology to the transmission of audio data generated at a regular interval.

For such a reason, it is necessary to define a new mechanism in which periodically generated data, such as audio streams, is transmitted and received using the BLE technology.

Furthermore, in BLE, it is difficult to transmit an audio signal because the operation of the link layer for the transmission of an audio signal has not been defined. It is necessary to define a procedure for a user device (e.g., a headset or a phone) to search for a device capable of receiving and processing an audio signal although the audio signal is transmitted and for the device to transmit the audio signal to a target device.

Accordingly, the present invention provides a procedure for a user device to search for devices capable of recognizing and processing a user's audio signal and for the devices to transmit the processed audio signal to a target device in order to control devices through a user's voice.

Hereinafter, a method for sending and receiving data (e.g., audio data) generated at a regular interval using the BLE technology is described in detail.

In other words, a method for newly defining a channel for sending and receiving (or transceiving) data generated at a regular interval in the BLE technology, additionally defining a mechanism related to the handling of regular data without affecting energy performance of BLE, and sending data generated at a regular interval is provided below.

The phrases, such as audio streaming data, audio data, audio streaming, and audio stream used in this document, may be construed as providing the same meaning.

The term "audio data" is hereinafter used to represent the different terms, for convenience of understanding.

Isochronous Channel and Definition of a Mechanism Related to Isochronous Channel A new channel, that is, an isochronous channel, is defined to send data generated at a regular interval using the BLE technology.

An isochronous channel is used to send isochronous data to devices using isochronous streams.

Isochronous data refers to data transmitted at a particular time interval, that is, periodically or regularly.

In other words, an isochronous channel may represent a channel for sending and receiving periodically generated data, such as audio data, in the BLE technology.

An isochronous channel may be used to send and receive audio data to and from a single member, three of one or more coordinated members, or a plurality of members.

Furthermore, an isochronous channel corresponds to an isochronous stream, such as an audio stream, or a flushing channel which may be used to send and receive important data in other time regions.

Methods using an isochronous channel described later are used independently of the advertising channel and data channel defined in the existing (v4.2 or earlier) BLE technology.

Furthermore, this document additionally defines a new frequency channel and frequency hopping interval for an isochronous channel.

An isochronous channel enables a conductor to send an isochronous stream such as flushable data (e.g., time-bound audio data) to one or more members using the BLE.

In this case, the conductor may be represented as a master, and the member may be represented as a slave.

Furthermore, an isochronous channel may or may not be configured by security setting.

Furthermore, an isochronous channel may be set up for various topologies to allow the transmission of an isochronous stream between a single conductor and a member, between a single conductor and a coordinated pair of members which generates a stereo audio stream, such as hearing aids or stereo headsets, and between a single conductor and a plurality of members synchronized with the same isochronous stream(s).

In this case, the member may send data to the conductor through an isochronous channel.

Furthermore, the isochronous channel may support the transmission and reception of shared audio, public audio, and broadcast audio as well as the transmission and reception of personal audio.

A procedure for setting up an isochronous channel requires that hierarchy of profile level security and reliability requirements satisfy use cases.

Furthermore, an isochronous channel may be used for various applications, by which a plurality of audio sources and sinks may be set up, and complicated topologies may be set up to allow users to regularly change or share different audio streams.

Figure 7:
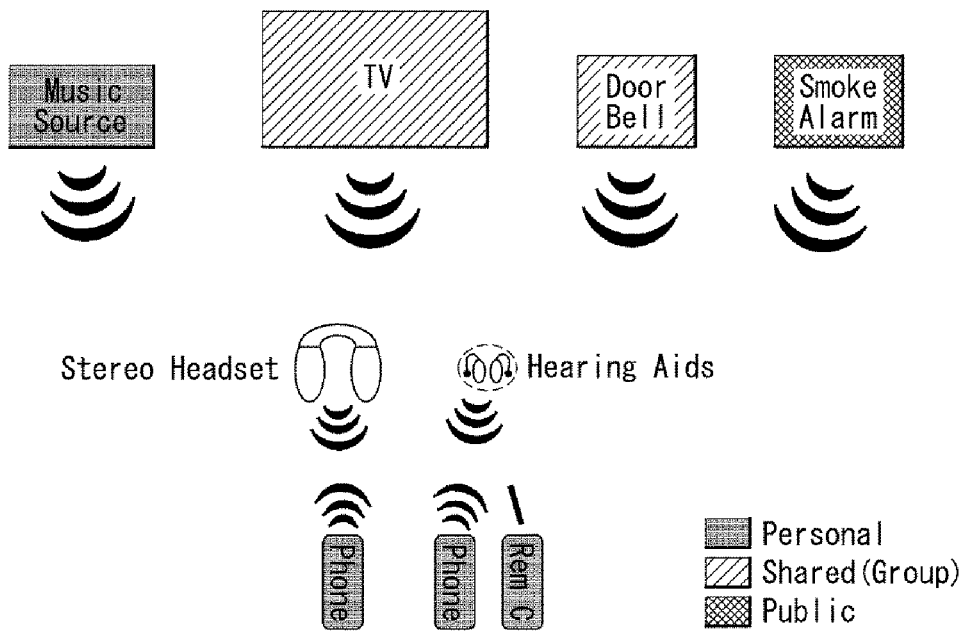
FIG. 7 shows an example of a home ecosystem for applications in which an isochronous channel may be used.

FIG. 7 shows an example of a home ecosystem for applications in which an isochronous channel may be used.

That is, FIG. 7 shows examples of the spaces where multiple audio conductors and members can move inside/outside mutual areas to which methods proposed in this specification may be applied.

As shown in FIG. 7, the presence of various conductors and members may mean that an isochronous channel is necessary as a method for providing notification of the presence of the members so that the members can obtain information necessary to configure the isochronous channel.

The isochronous channel may also be used for the transmission and reception of non-audio data.

A member may use isochronous channels in order to determine whether notification messages that may include information obtained from conductors within a BLE communication range are present.

Furthermore, a member may use isochronous channels in order to receive a request for control information or service data from one device or one or more devices that behave like a remote controller.

Figure 8:
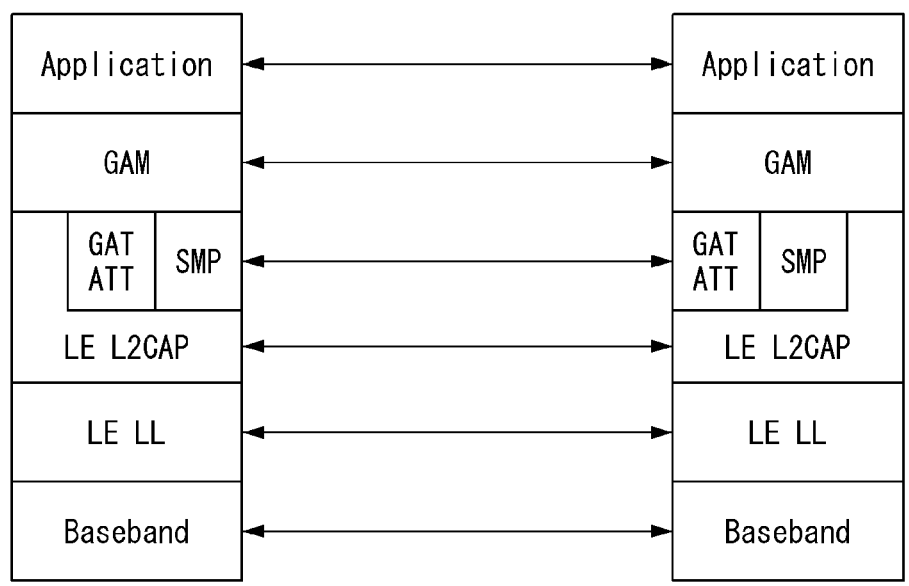
FIG. 8 shows an example of a generic audio middleware (GAM) protocol stack to which the present invention may be applied.

FIG. 8 shows an example of a generic audio middleware (GAM) protocol stack to which the present invention may be applied.

Audio architecture including an audio middleware layer may support unicast and broadcast audio using BLE.

The audio middleware layer facilitates transition between the connections of audio application programs and can develop a further advanced user case.

As shown in FIG. 8, the GAM may provide a user with a smooth audio service even in the dynamic and multi-profile environment by adding the audio middleware layer capable of accessing all audio profiles. The middleware may process the audio mixing of various user cases and transition between user cases, so each profile may focus on a specific function.

The GAM may support multiple profiles, and thus a user may select an audio content range and an application program that may smoothly moves between voice operation devices.

The GAM defines announcements for audio streaming, audio control and signal transmission for data transmission. The application layer defines application signaling and a required transmission parameter.

Figure 9:
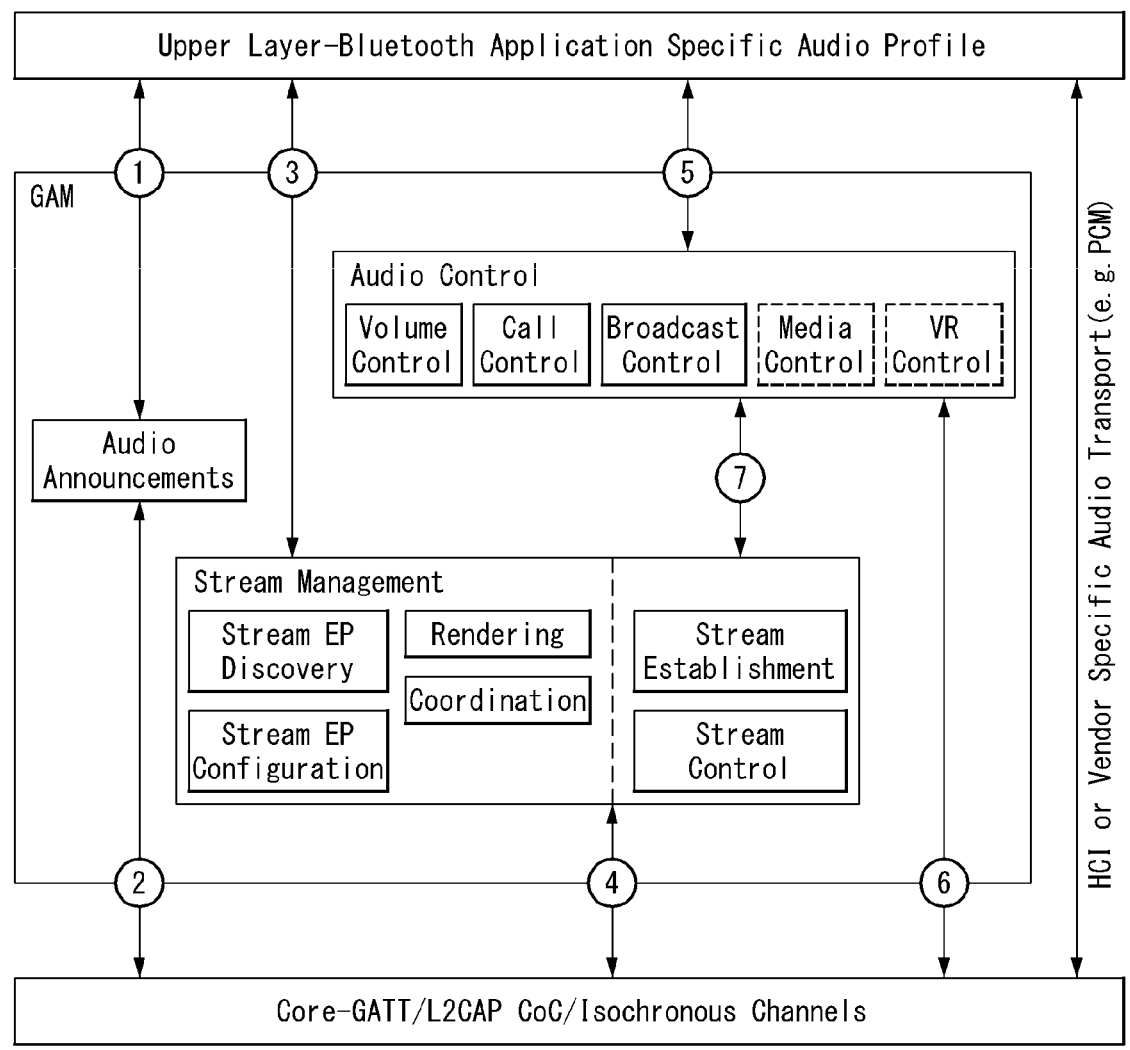
FIG. 9 shows an example of a generic audio middleware (GAM) architecture to which the present invention may be applied.

FIG. 9 shows an example of a generic audio middleware (GAM) architecture to which the present invention may be applied.

FIG. 9 shows where the GAM is positioned within an overall Bluetooth architecture. Application profiles over the GAM interact with a specific function entity within the middleware.

The function entities grouped as follows.

Audio stream announcement and search: define the availability of a procedure of announcing the availability of an audio stream or a device capable of consuming an audio stream. Furthermore, an Audio Stream Announcement and Discovery function entity may be used to search for a device.

Stream management: a procedure of configuring and forming an end point within a device provides the coordination of multiple sinks and sources, the management of policies and transition between streams. A stream configuration procedure provides information required by an initiator in order to indicate that an isochronous channel needs to be scheduled with respect to a core. Stream control includes a configured end point, the state system of each channel within a stream, and a procedure of providing audio data between the state systems.

Audio control: a procedure of activating a device function when an audio stream is configured. Basic call control capable of permitting, rejecting and requesting a stream may be included in the procedure.

Broadcast control: configure a broadcast audio channel and activate volume control.

Media control and VR control may be added to a subsequent release as other audio work group defines requirements. An additional common control function may be added to support other use cases, if necessary. They inherit the characteristic of a previously defined control procedure. A state system duplicated into each device coordinated using a common procedure for posting the state on an acceptor is included in each control element.

Six interfaces for interacting with a higher layer and a lower layer have been defined in the GAM as in Table 2.

TABLE 2

| Interface | Description |
| --- | --- |
| 1 | Interface to application-specific profile for announcements and discovery. |
| 2 | Interface to Core to send and receive audio announcements. |
| 3 | Interface to application-specific profile for stream management. |
| 4 | Interface to Core for isochronous channel configuration, establishment and stream control. |
| 5 | Interface to application-specific profile for audio control. |
| 6 | Interface to Core for audio control. |

Furthermore, an additional interface for audio control within the GAM and a stream management entity may be defined as in Table 3.

TABLE 3

| Interface | Description |
| --- | --- |
| 7 | Interface to allow Audio Control actions to invoke the relevant Stream Management functions and associated actions. |

Stream announcement and discovery, stream management and audio control interface ①, ③ and ⑤ may interact with a higher layer application program-related profile using primitives shown in Table 4.

TABLE 4

| Interface | Primitives |
| --- | --- |
| 1 | Announce Metadata (Initiator) |
|  | Discover Metadata (Acceptor) |
|  | Read Acceptor Status |
|  | Publish Acceptor Status |
|  | Metadata Received Event |
| 3 | ACE discovery and configuration |
|  | Rendering Endpoint |
|  | Presentation Delay |
|  | Acquisition Delay |
| 5 | Outgoing Call |
|  | Incoming Call |
|  | Accept Call |
|  | Hold Call |
|  | Reject Call |
|  | Terminate Call |
|  | Mute/Unmute Microphone |
|  | Mute/Unmute Speaker |
|  | Volume Control |
|  | List of current Calls |
| 7 | Open Stream |
|  | Configure Stream (flush timeout, retransmission, etc.) |
|  | Start Stream |
|  | Suspend Stream |
|  | Close Stream |
|  | Release Stream |

The present invention provides a method of controlling a target device through a voice signal using such a GAM.

Figure 10:
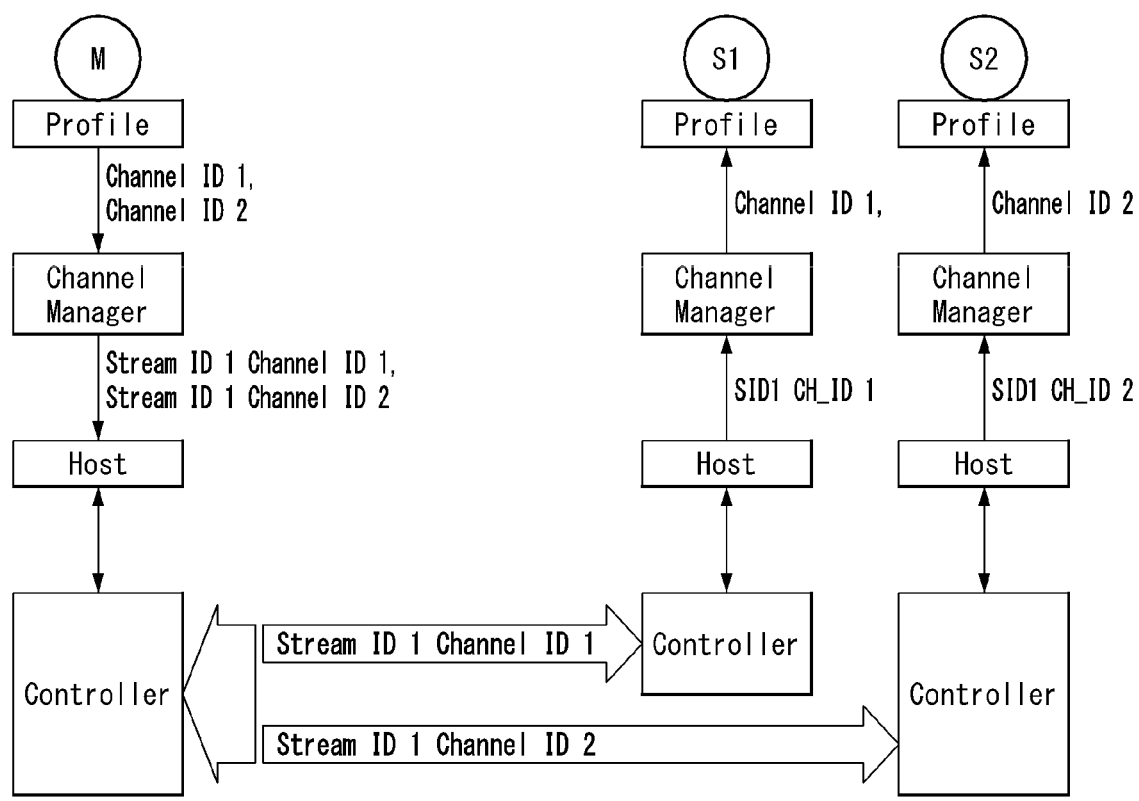
FIGS. 10 and 11 are diagrams showing examples of isochronous connection-oriented (ICO) and connectionless isochronous (ICL) channels and streams to which the present invention may be applied.
Figure 11:
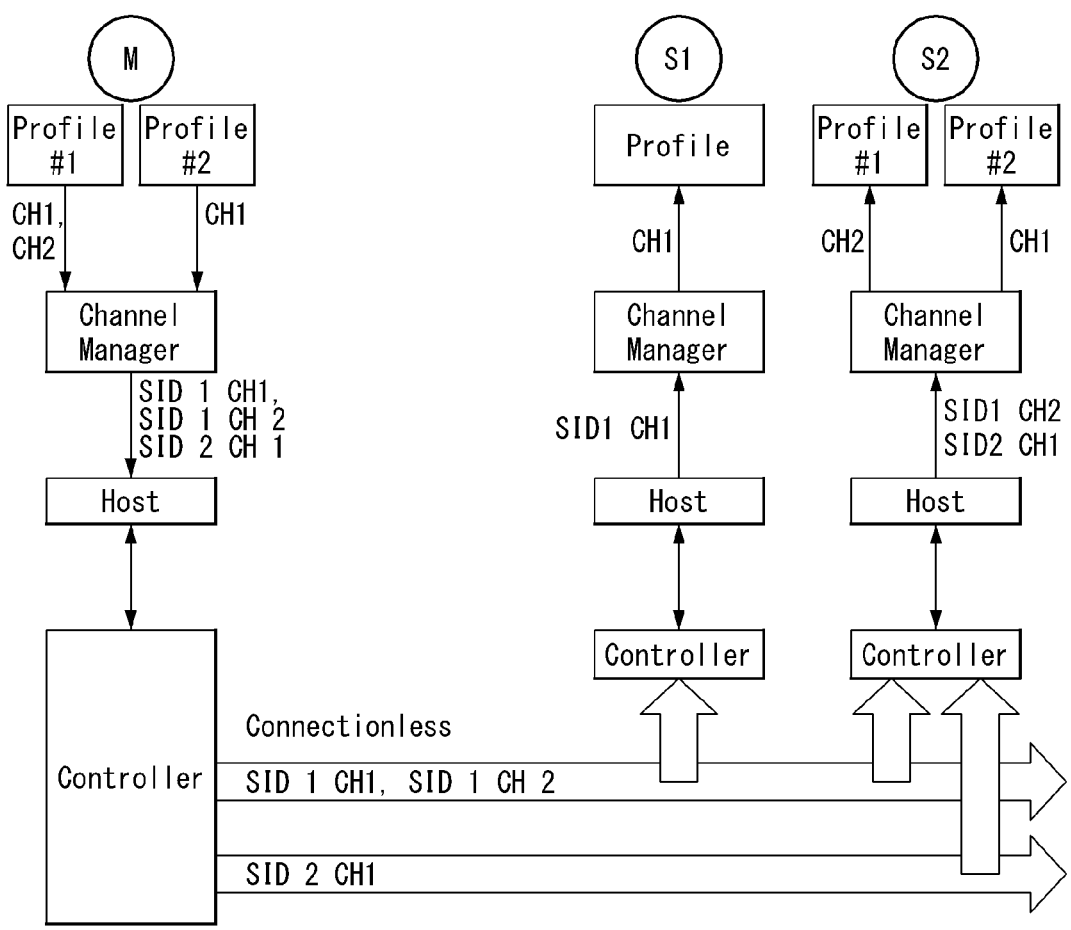

FIGS. 10 and 11 are diagrams showing examples of isochronous connection-oriented (ICO) and connectionless isochronous (ICL) channels and streams to which the present invention may be applied.

In Bluetooth LE, an isochronous channel, that is, a channel for transmitting and receiving audio data, is divided into ICO and ICL.

ICO is a channel based on a connection of Bluetooth LE. After an ACL connection is established between two devices connected through Bluetooth LE, the devices may be configured.

An application profile may request an isochronous stream having one or more time-related channels. A profile manager (or some middleware) manages the requests of several profiles, assigns a stream ID to each profile, and assigns a channel ID to a channel in a corresponding profile. A stream ID and a channel ID are transmitted when a master (M) configures an ICO channel in a slave 1 (S1) and a slave 2 (S2), as shown in FIG. 10.

In the case of ICO, one stream may be divided into two channel IDs and transmitted to the S1 and the S2. For example, if the S1 is a wireless earphone worn on the right ear of a user and the S2 is a wireless earphone worn on the left ear of the user, the user may listen to music transmitted by the M in stereo, as shown in FIG. 10.

ICL is a channel not based on a connection of Bluetooth LE and may be used for the broadcast of isochronous data. To broadcasts the isochronous data of an ICL channel may be performed using a frequency hopping scheme.

ICO and ICL may transmit an audio signal to a plurality of devices and a plurality of profiles using a stream ID and a channel ID.

Table 5 shows an example of device types defined in the audio technology of Bluetooth LE and operation methods according to the device types.

TABLE 5

| Device | Event | Initiation | Underlying Action | Typical | Max |
|---|---|---|---|---|---|
| Phone | Incoming Call | External | ICO established | 2 sec | 5 sec |
|  | Start Call | User initiated on phone | ICO established | 2 sec | 5 sec |
| TV | Turn On | User selects HA connection with controller. | ICO established | 5 sec | 10 sec |
|  | Turn On | ISO established with speakers? | ICO established | 5 sec | 10 sec |
|  | Add user | Needs Controller | Distribute GLK | 5 sec | 10 sec |
| Tablet | Video play | Local on tablet | ICO changes to ICL | 2 sec | 5 sec |
|  | Add user | User initiated | ICO > changes to ICL | 2 sec | 5 sec |
| Laptop | VoIP Call | External (incoming call) | ISO established | 2 sec | 5 sec |
|  |  | User initiated | ISO established | 2 sec | 5 sec |
| Remote Control | User press | Local (select device or volume, etc.) | ACL command to HA | 1 sec | 3 sec |
|  | Find Broadcasters | Background task? | Scan Audio-As | ? | 10 sec |
| Speaker | User presses ON | Local (connects to default source) | ICO established | 5 sec | 10 sec |
|  | User changes audio source | Action at speaker (if supported) or source | ICO established | 5 sec | 10 sec |
| Doorbell | Rings | External | ISO established | 2 sec | 5 sec |
| HA/ Headset | Start Call | User initiated (open voice recog. channel) | ISO established | 1 sec | 4 sec |
| Audio Gateway | Voice Command | External (User intitiating) | ISO established | 1 sec | 3 sec |

A user authentication service (UAS) for registering/authenticating a user based on a BLE communication method is described below through FIGS. 12 to 14.

A user may automatically unlock a BLE device or release the password of the front door using the UAS.

The UAS defines two guy types of devices: a UAS client (hereinafter client), and a UAS server (hereinafter server). A device that stores (e.g., iris information, fingerprint information) of a user is called a server. A device that exchanges protocols with the server and performs addition, deletion and update, etc. on user information (e.g., token) is called a client.

Hereinafter, a detailed procedure is described in each drawing.

Registration Session

Figure 12:
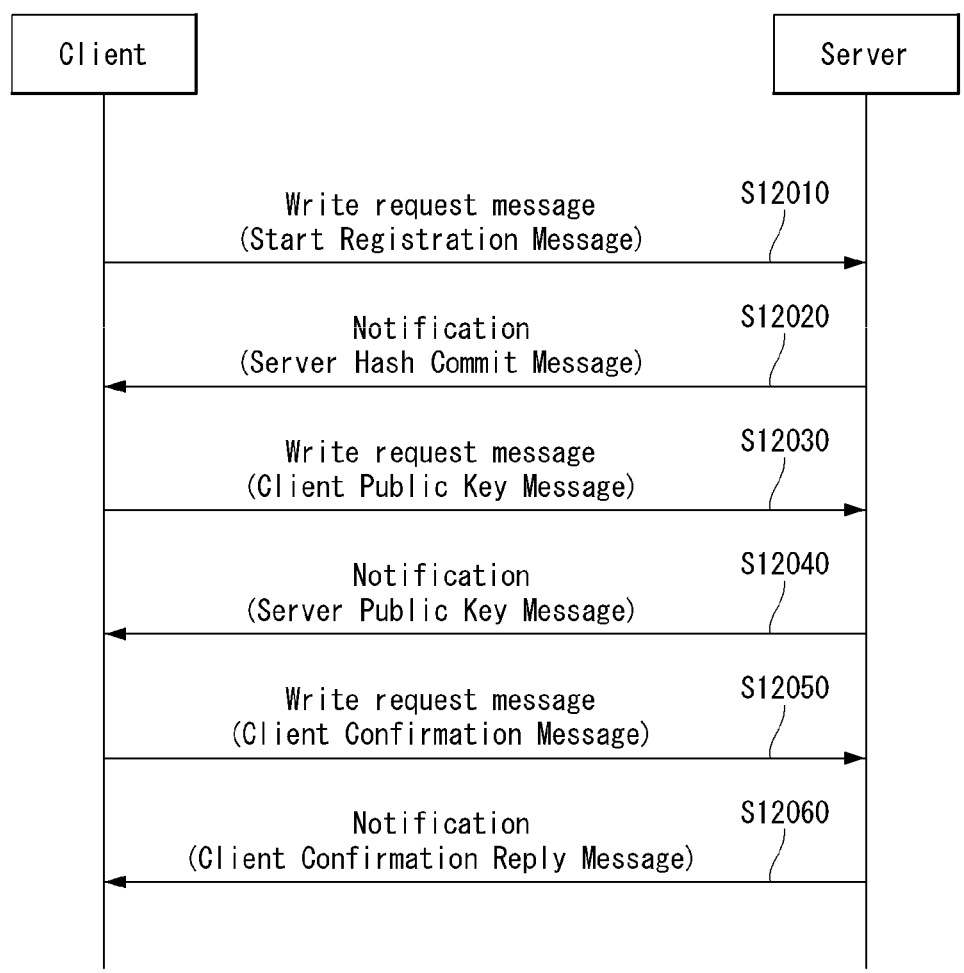
FIG. 12 is a flowchart showing an example of a method of registering a user device to which the present invention may be applied.

FIG. 12 is a flowchart showing an example of a method of registering a user device to which the present invention may be applied.

A client may be registered with a server through a registration session procedure. The registration session procedure includes a notification procedure, hash value generation procedure, public key exchange procedure and registration ID generation procedure of an authentication method.

Specifically, the client transmits a write request message to the server in order to notify the server of the start of registration (S12010).

In this case, the write request message may be a message that does not require a response, and may be called a Start Registration Message.

The server that has received the write request message from the client notifies the client of its own user interaction type by transmitting a notification message to the client in order to perform a registration session procedure with the client (S12020).

For example, if the server can recognize a user based on fingerprint recognition, password entry, etc., the server transmits a notification message, including capability information indicating that it supports fingerprint recognition, a password, to the client in an interaction type.

In this case, the notification message may be called a Server Hash Commit message.

Thereafter, the client transmits a write request message, including its own public key, to the server. The server transmits a notification message, including its own public key, to the client as a response thereto (S12030, S12040).

The client that has exchanged the public keys with the server through step S12030 and step S12040 transmits a write request message, including message authentication code (MAC) for authentication, to the server (S12050).

The server authenticates the client through the MAC received from the client, and transmits a notification message to the client as a response to the write request message (S12060).

Through such a procedure, the server can register and authenticate the client.

Secure Session

Figure 13:
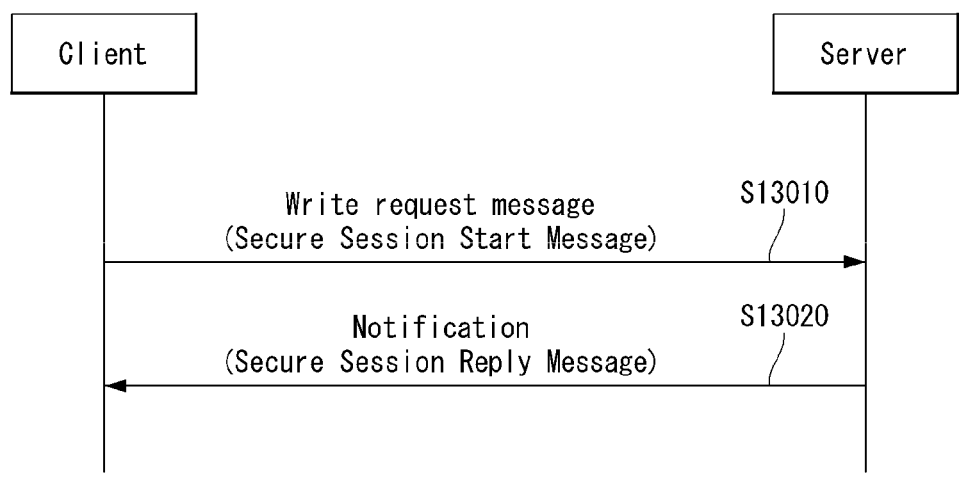
FIG. 13 is a flowchart showing an example of a method of generating a secure session to which the present invention may be applied.

FIG. 13 is a flowchart showing an example of a method of generating a secure session to which the present invention may be applied.

A client and a server may perform registration and authentication through a registration session procedure and then establish an encrypted link for transmitting and receiving data through a secure session procedure.

That is, the client and the server may establish a secure link using registration IDs transmitted and received through a registration session procedure before they transmit and receive data.

Specifically, the client transmits a write request message to the server in order to start a secure session procedure (S13010). In this case, the write request message for starting the secure session procedure may be called a Secure Session Start message.

The server that has received the Secure Session Start message establishes a secure link with the client using the registration ID of the client, and transmits a notification message to the client as a response to the Secure Session Start message (S13020).

In this case, the notification message may be called a Secure Session Reply message.

Through such a procedure, the client and the server can establish a secure link for exchanging data, such as user information.

Secure Get/Put Operation

Figure 14:
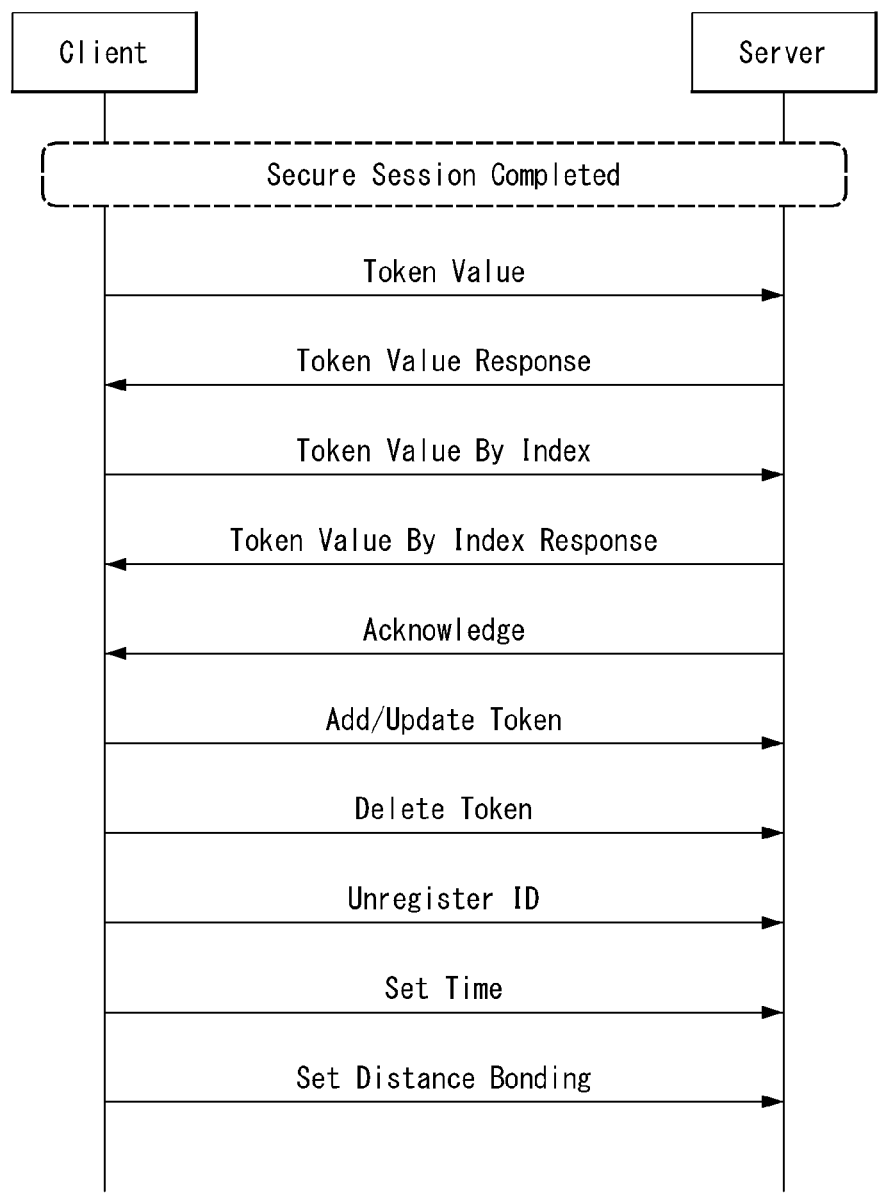
FIG. 14 is a flowchart showing an example of a method of adding, deleting and updating user information to which the present invention may be applied.

FIG. 14 is a flowchart showing an example of a method of adding, deleting and updating user information to which the present invention may be applied.

A client and a server may establish a secure link through a secure session procedure described in FIG. 13, and may then perform a Secure Get/Put operation for obtaining, adding, deleting and/or updating user information (hereinafter token) for identifying a user.

Specifically, the client transmits a Secure Get Token Value message to the server based on a token issuer and interaction type in order to obtain a token from the server.

The Secure Get Token Value message may include a user ID, a token issuer, an interaction type and a MAC value.

The user ID indicates an ID assigned through the registration session procedure described in FIG. 12. The token issuer indicates the type of a device that has generated a token.

The server transmits a token value response message, including a token value, to the client as a response to the Secure Get Token Value message.

If the client wants to obtain available tokens from the server, the client may transmit the Secure Get All Token Value message to the server.

The Secure Get All Token Value message may include a user ID, a token index, all token count and a MAC value.

The token index indicates the index of the first token to be fetched from the server, and may have a value from 0 to a token count −1.

All Token Count indicates a maximum token number to be fetched, and may have a value until a smaller value of 1 (token count−token index) or 64.

The server transmits a Secure Get Token Value By Index Response message, including token values, as a response to the Secure Get All Token Value message.

The Secure Get Token Value By Index Response message may include a token index flag, all token payload and an MAC value.

The token index flag may indicate meanings, such as Table 6, depending on its value.

TABLE 6

| Bit Number | Definition |
| --- | --- |
| 0-5 | Token Count, Max Tokens in Response (See Note. 1) |
| 6 | Token Store Update (TSU) <br> 0 = False <br> 1 = True |
| 7 | End of List (EOL) <br> 0 = False <br> 1 = True |

All token payload may include a total size of tokens transmitted to the client and tokens requested by the client.

Furthermore, the server may transmit acknowledge as a response to the request of the client.

If the client wants to add or update a client-issued token associated with the token store of the client, it transmits a Secure Add/Update Token message to the server.

The server may add a token to the token store or update a stored token based on a token value and user ID included in the Secure Add/Update Token message transmitted by the client.

If the client wants to delete a client-issued token stored in the token store of the client, it transmits a Secure Delete Token message to the server.

The Secure Delete Token message may include a user ID, token index and MAC value associated with a token to be deleted.

The server may delete a token based on the ID of the received Secure Delete Token message.

If the client wants to delete a user ID registered with the server, it transmits a Secure Unregister ID message to the server.

The server that has received the Secure Unregister ID message from the client deletes the stored user ID and all metadata related to the user ID based on the user ID included in the Secure Unregister ID message.

Furthermore, resources of the token store related to the user ID are empty, and a secure session established between the server and the client is invalidated.

If the client wants to configure a user ID and/or the current time of the token store, it may transmit a time configuration message to the server. If the client wants to set a bonding-possible distance between the server and the client, it may transmit a Set Distance Bonding message to the server.

Through such a method, a client and a server can obtain, add, update and/or delete a token.

Figure 15:
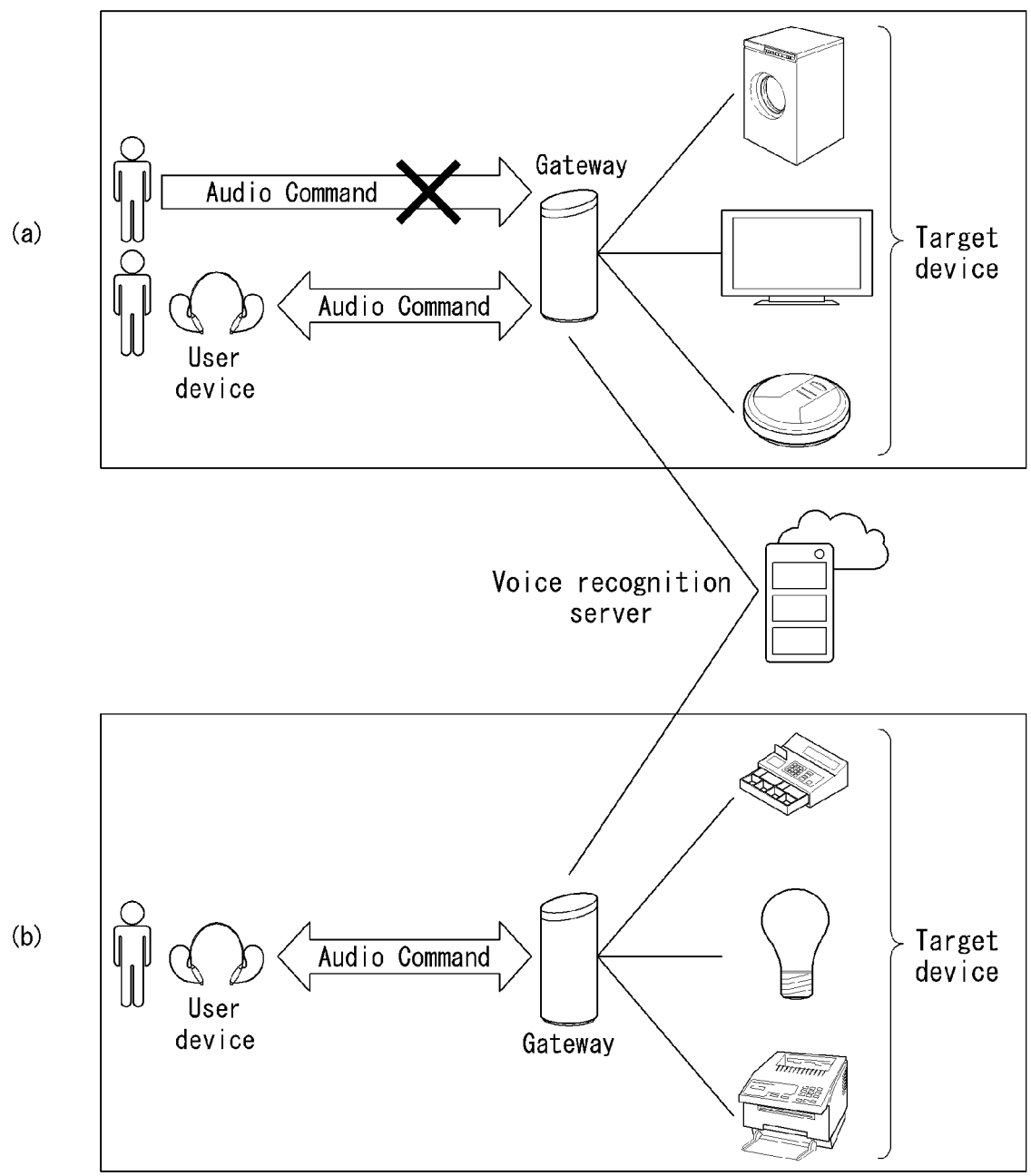
FIG. 15 shows an example of a method of controlling a device through voice recognition according to an embodiment of the present invention.

FIG. 15 shows an example of a method of controlling a device through voice recognition according to an embodiment of the present invention.

Referring to FIG. 15, a user device may control a target device through a voice for controlling the target device, obtained from a user.

Specifically, as shown in FIG. 15(a), a user has a limit that the user directly transmits, to a device (hereinafter gateway) that provides an artificial intelligence (AI) function, a command for controlling a target device through a voice.

For example, if a user and a gateway are apart from each other to the extent that the user cannot transmit a voice to the gateway or if a plurality of gateways supporting an AI function is present nearby, the user may not find a gateway for controlling a specific target device.

In this case, if the user uses a user device as shown in FIG. 15(b), the user may transmit a command for controlling a specific target device or a plurality of target devices to the gateway as an audio signal through an audio channel of BLE (hereinafter isochronous channel) using the user device. The gateway may control the target devices by processing the voice signal, obtained from the user device, through a voice recognition server.

The user device is a device that may be carried by the user, and includes a BLE module, and is a device capable of forming an audio channel for transmitting the audio signal to the gateway.

The voice recognition server is a device capable of understanding and processing the meaning of the user's voice signal transmitted by the user device, and chiefly has a server form. If the gateway cannot directly process the voice signal, it may request the voice recognition server to process the voice signal.

The audio channel is a channel capable of exchanging voice signals (or data) in BLE, and may mean ICO and ICL in the present invention. The audio channel may be configured with 3 primary channels and 37 secondary channels.

ICO does not require chaining between channels because it is based on a BLE connection. In contrast, ICL requires chaining between channels because it is not based on a BLE connection.

Chaining between channels means a method in which information indicative of a channel through which next data or additional data is transmitted is included in a data packet. That is, when a device in a non-connection state receives a packet including data through a primary channel, information indicative of a secondary channel in which next data of transmitted data or additional data is transmitted is included in the packet.

Accordingly, a device may move to the secondary channel based on the channel information included in the packet, and may receive the next data or additional data.

Figure 16:
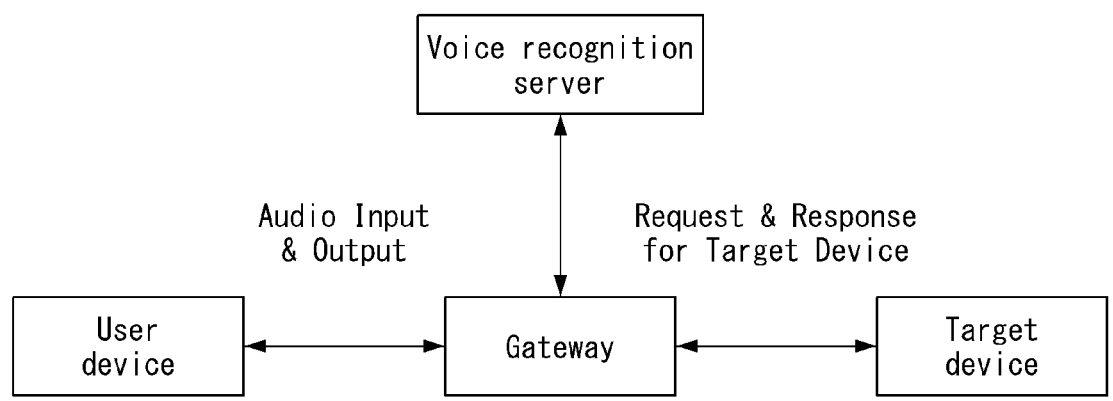
FIG. 16 shows an example of message transmission between devices for controlling a device through voice recognition according to an embodiment of the present invention.

FIG. 16 shows an example of message transmission between devices for controlling a device through voice recognition according to an embodiment of the present invention.

As shown in FIG. 16, a network for controlling a target device through voice recognition may be configured with a user device, a gateway, a voice recognition server and a target device.

In FIG. 16, the user device has been registered with the gateway and the voice recognition server through the above-described UAS.

The user device converts a voice, obtained from a user, into an audio signal and transmits it to the gateway through ICL or ICO, that is, an audio channel.

If the gateway can interpret and process the audio signal, it interprets and processes the audio signal received from the user device. However, if the gateway cannot interpret and process the audio signal converted from the user's voice, the gateway requests the voice recognition server to interpret and process the audio signal by delivering the audio signal to the voice recognition server.

The voice recognition server interprets the audio signal received from the gateway, and processes the audio signal so that the gateway can interpret the audio signal. Thereafter, the voice recognition server transmits the processed audio signal to the gateway as a response to the request.

The gateway transmits a request for controlling the target device to the target device based on the response received from the voice recognition server, and may receive the audio signal from the target device as a response thereto.

Through such a method, a user can control target devices through a voice at a remote distance using a user device.

Figure 17:
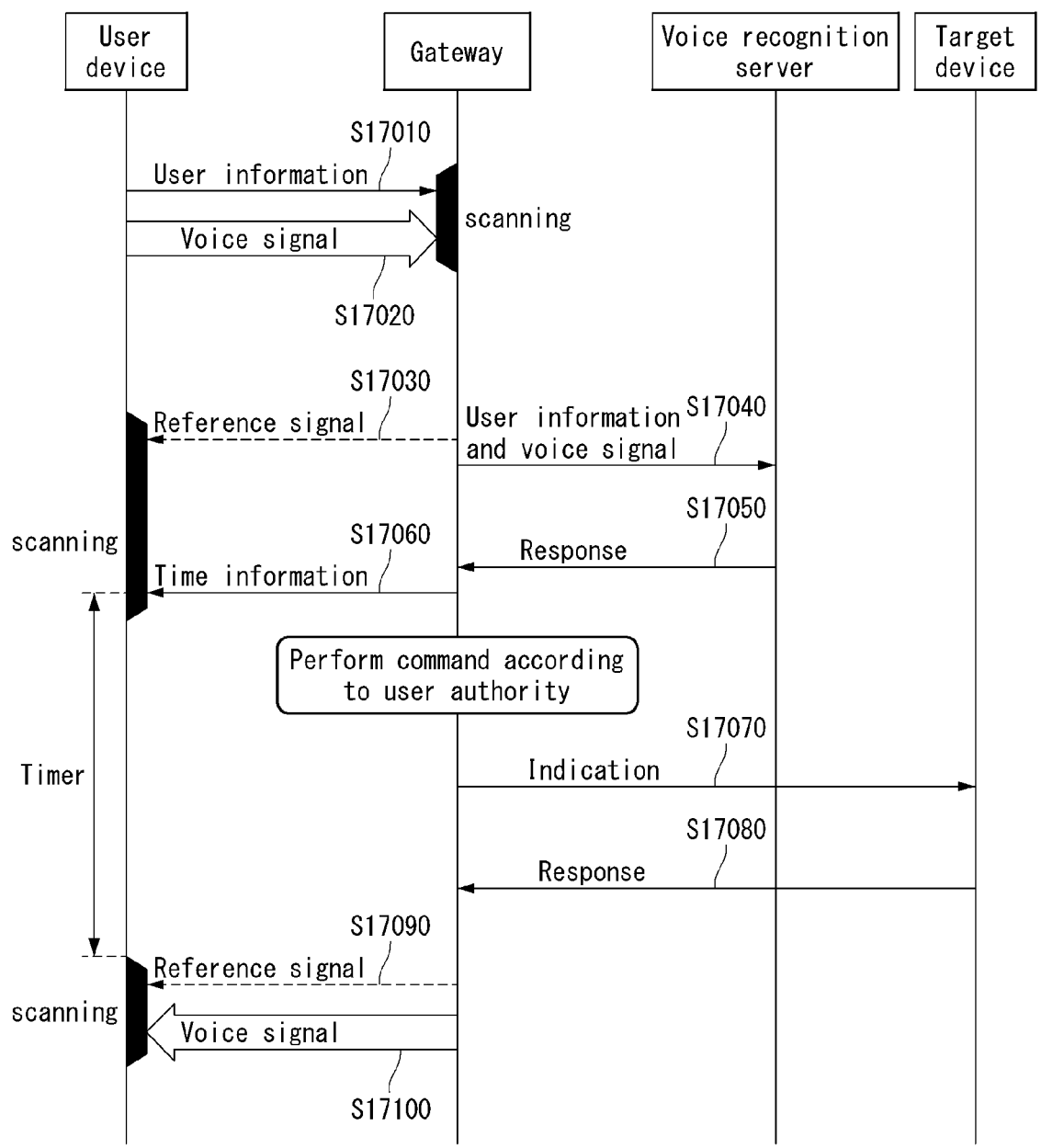
FIG. 17 is a flowchart showing an example of a method of controlling a device through voice recognition according to an embodiment of the present invention.

FIG. 17 is a flowchart showing an example of a method of controlling a device through voice recognition according to an embodiment of the present invention.

Referring to FIG. 17, a user device may control at least one target device through a gateway based on a voice received from a user.

Specifically, the user device discovers the gateway through a discovery procedure and transmits a message, including user information for identifying the user, to the discovered gateway (S17010).

The message may further include an artificial intelligence (AI) field indicating that the user device supports an AI function capable of recognizing a voice and a registration ID for identifying whether the user device is a registered device.

The user information may include a user name for identifying the user using the user device, a user ID, list information indicative of a list of gateways previously used by the user device, and security information.

The security information may include values exchanged through the registration session described in FIG. 12, such as the public key of the user device.

In this case, the message transmitted from the user device to the gateway at step S17010 may be called a reference message or a reference signal. The user device may notify the gateway that it has been prepared to deliver a voice signal through the message.

Thereafter, the user device converts a voice, received from the user, into a voice signal and transmits the voice signal to the gateway through an audio channel (S17020). In this case, if the gateway and the user device have been connected through BLE, the voice signal is transmitted through an ICO channel. However, if the gateway and the user device have not been connected through BLE, the voice signal is broadcasted or multicasted through an ICL channel.

The gateway notifies the user device that it has been prepared to perform control through a voice signal by transmitting a reference signal, including an AI field, to the user device (S17030).

The reference signal is a signal (or message) for establishing synchronization, and may be used for the gateway to notify the user device of the preparation state in which the gateway can operate. When the user device receives the reference signal from the gateway, it expects that a message will be transmitted by the gateway and performs a scanning operation for receiving the transmitted message.

The gateway determines whether it can directly interpret and process the transmitted voice signal.

If the gateway can directly interpret and process the voice signal, the gateway may control the target device by interpreting and processing the received voice signal.

Specifically, the gateway recognizes a specific operation to be controlled through a voice signal by interpreting and processing the received voice signal.

Thereafter, the gateway determines an estimated time taken for the target device to perform the specific operation, and transmits time information indicative of the determined time to the user device (S17060).

If the user device receives the time information from the gateway, power consumption can be reduced because the user device may not perform a scanning operation corresponding to the estimated time.

After the gateway transmits the time information, it determines the user's authority based on the user information. That is, the gateway determines whether the user has authority capable of controlling the specific operation of the target device recognized through a voice signal.

If the user's authority is authority incapable of controlling the specific operation recognized through a voice signal, the gateway outputs a reply message and/or voice signal, indicating a control failure of the target device and an operation that cannot be controlled by a current user authority, to the user device.

However, if the user's authority is authority capable of controlling the specific operation recognized through a voice signal, the gateway indicates the specific operation by transmitting an indication message to the target device (S17070).

The target device performs the specific operation indicated by the gateway, and notifies the gateway of a result of the execution of the specific operation by transmitting a response message to the gateway (S17080).

The gateway receives the response message, indicating a result of the execution of the specific operation, from the target device, and notifies the user device that a message will be transmitted by transmitting a reference signal to the user device (S17090).

Thereafter, the gateway notifies the user device of a result of the execution of the specific operation of the target device.

If a result of the execution of the specific operation is a voice signal, the gateway transmits a voice signal to the user device through an audio channel (S17100).

In this case, if the gateway and the user device have been connected through BLE, the voice signal is transmitted through an ICO channel. However, if the gateway and the user device have not been connected through BLE, the voice signal is broadcasted or multicasted through an ICL channel.

When the user device receives the reference signal after an estimated time and/or from the gateway, it may receive a result of the execution of the specific operation from the gateway by performing a scanning operation.

If a result of the execution of the specific operation requires output, such as a voice signal, the user device displays a result of the execution of the specific operation on a display unit (e.g., display or speaker).

For example, when the user requests "weather in a specific area" from the user device, the user device may display "weather in a specific area", received from the gateway, on the display unit.

If the gateway has not interpreted and processed the voice signal received from the user device at step S17020, the gateway calculates how a command received from the user will be performed by transmitting the voice signal and the user information to a voice recognition server (S17040).

The voice recognition server is a device capable of recognizing and processing a voice signal, and may determine a specific operation of a target device to be controlled by interpreting and processing a voice signal received from the gateway.

Thereafter, the voice recognition server notifies the gateway of the determined specific operation through a response message (S17050).

The gateway recognizes the specific operation of the target device to be controlled through the response message received from the voice recognition server.

Subsequent operations are the same as those of step S17060 to step S17100, and a description thereof is omitted.

In the present embodiment, step S17030 and step S17090 are optional steps and may not be performed.

Through such an operation, there are effects in that a user can control a target device at a remote place using BLE through a user device and power consumption of a user device can be reduced.

Figure 18:
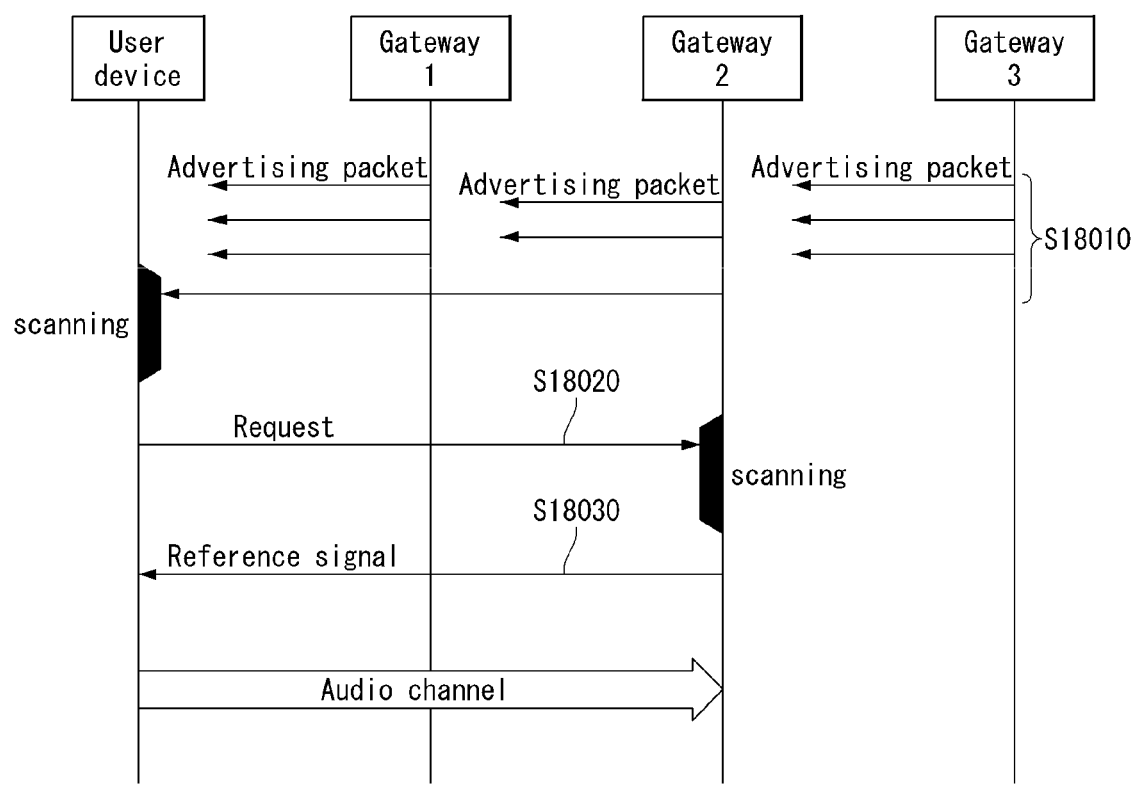
FIG. 18 is a flowchart showing an example for discovering a gateway for controlling a device through voice recognition according to an embodiment of the present invention.

FIG. 18 is a flowchart showing an example for discovering a gateway for controlling a device through voice recognition according to an embodiment of the present invention.

Referring to FIG. 18, a user device may discover a peripheral gateway supporting an AI function through a manual discovery procedure, and may open an audio channel.

Specifically, gateways (gateway 1, gateway 2, gateway 3) periodically broadcast advertising packets through BLE (S18010).

In this case, the advertising packet is transmitted through an advertising channel, and may include an AI field indicating whether an AI function is supported and a gateway ID for identifying the gateway.

The user device may receive the advertising packets transmitted by the gateways through a scanning operation.

The user device may identify a gateway through the gateway ID of an advertising packet received through the scanning operation, and may recognize whether the identified gateway supports an AI function through the AI field.

The user device transmits a request message for requesting the opening of an audio channel for the transmission and reception of a voice signal to an identified gateway (gateway 2), supporting the AI function, through the advertising packet (S18020).

The user device may identify whether the gateway 2 has been prepared to receive a voice signal through the request message.

The gateway 2 receives the request message, received from the user device, through the scanning operation and transmits a reference signal (or response message) to the user device as a response to the request message (S18030).

Thereafter, the user device and the gateway are synchronized based on the reference signal (or response message) and open an audio channel for transmitting and receiving audio signals.

Through such a method, a user device can discover a peripheral gateway capable of controlling target devices through a voice signal, and may open an audio channel with the discovered gateway.

Figure 19:
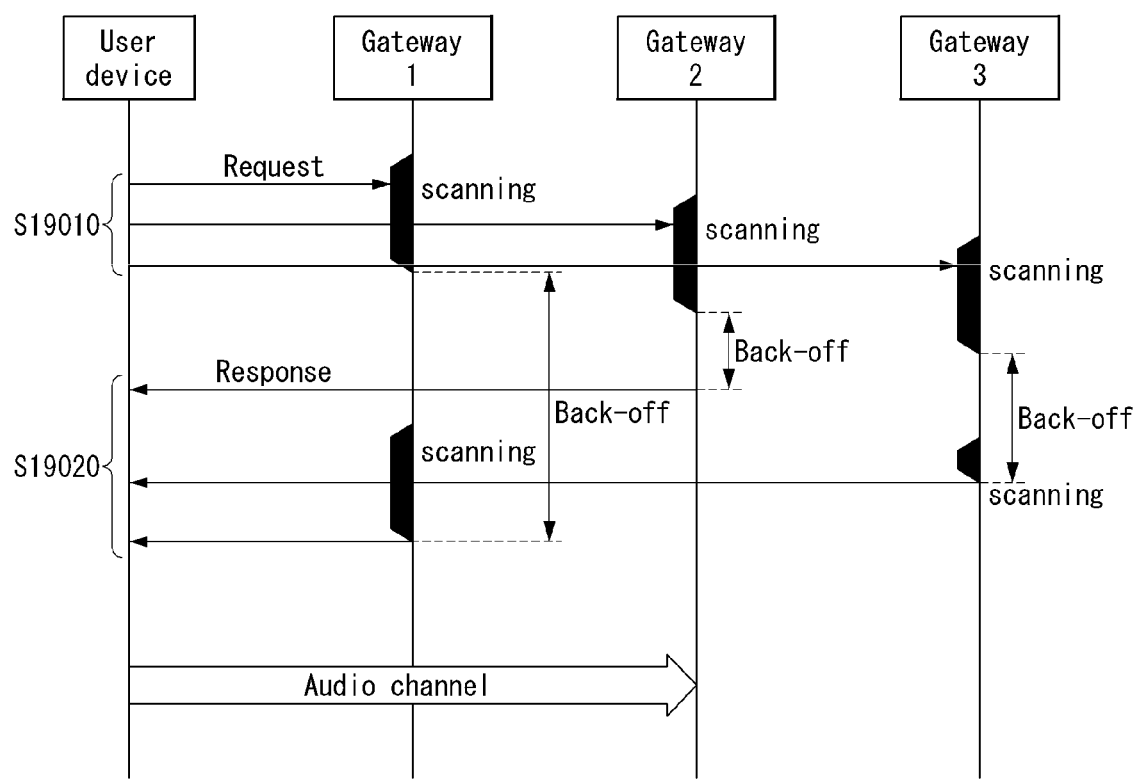
FIG. 19 is a flowchart showing another example for discovering a gateway for controlling a device through voice recognition according to an embodiment of the present invention.

FIG. 19 is a flowchart showing another example for discovering a gateway for controlling a device through voice recognition according to an embodiment of the present invention.

Referring to FIG. 19, a user device may discover a peripheral gateway supporting an AI function through an active discovery procedure, and may open an audio channel.

Specifically, the user device periodically broadcasts a request message that requests whether a voice signal has been prepared to be received in order to discover peripheral gateways supporting an AI function (S19010).

In this case, the request message is transmitted through an advertising channel, and may include an AI field indicating whether the AI function is supported and a user ID for identifying the user device.

Gateways (gateway 1, gateway 2, gateway 3) that have received the request message from the user device perform back-off for a given time and broadcast response messages as a response to the request message after the back-off time (S19020).

If the gateways receive a response message transmitted by another gateway before they transmit the response messages, they may not transmit the response messages.

Thereafter, the user device opens an audio channel for transmitting and receiving audio signals to and from the gateway 2 that has transmitted the response message.

Through such a method, a user device can directly discover a peripheral gateway capable of controlling target devices through a voice signal, and may open an audio channel with the discovered gateway.

Figure 20:
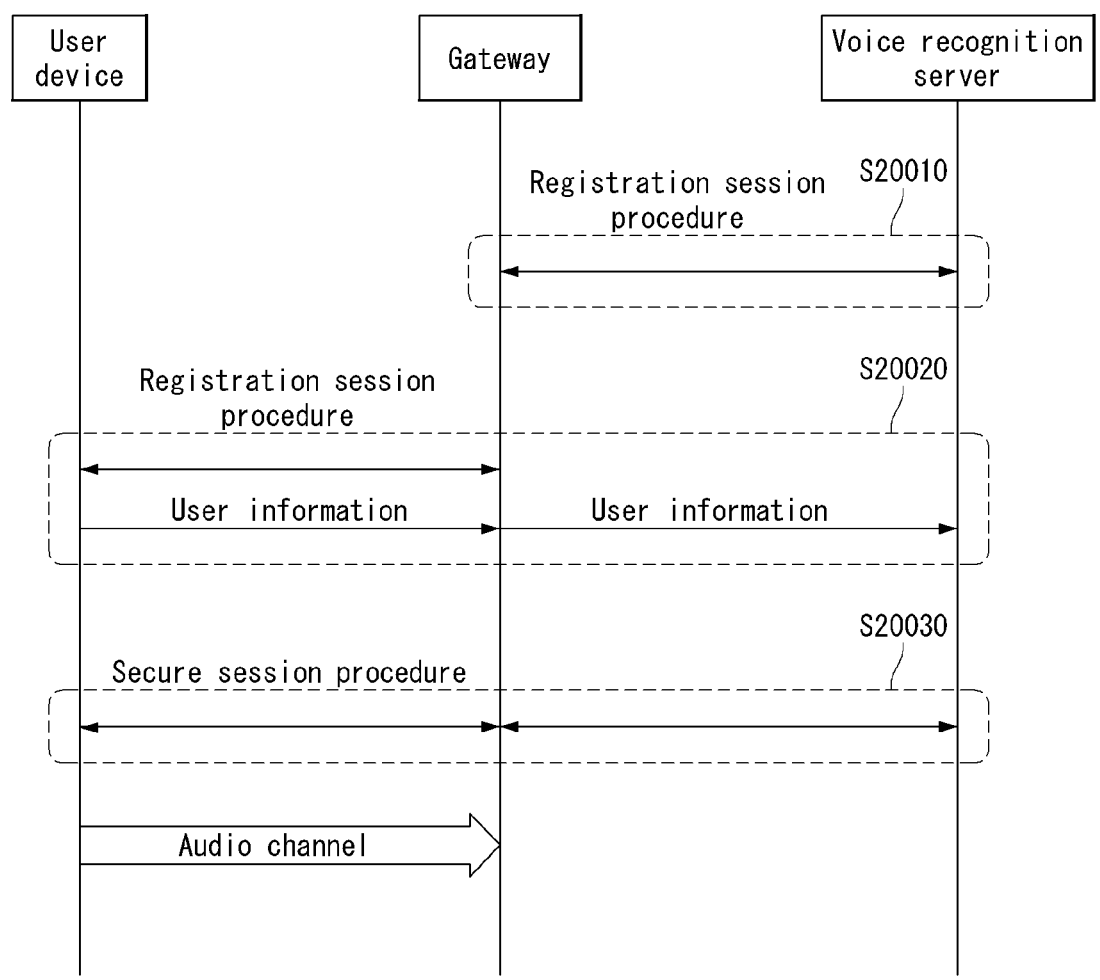
FIG. 20 is a flowchart showing an example of a method for registering a device according to an embodiment of the present invention.

FIG. 20 is a flowchart showing an example of a method for registering a device according to an embodiment of the present invention.

Referring to FIG. 20, a user device may be registered with a gateway and a voice recognition server through a registration session procedure, and may establish an authentication and secure link through a secure session.

Specifically, the gateway is initially registered with the voice recognition server through a registration session procedure (S20010). In this case, the registration session procedure may be the same as the registration session procedure of the UAS described in FIG. 12. The gateway may be assigned a registration ID through the registration session procedure.

For example, the gateway may be registered with the voice recognition server through a registration session with the voice recognition server when the gateway is installed.

The user device may be initially registered the gateway through a registration session procedure (S20020). The user device, gateway and voice recognition server may share user information (e.g., user name) through the registration session procedures.

For example, the user device may be registered with the gateway through the registration session procedure, and may transmit the user information to the gateway. The gateway may transmit the user information, received from the user device, to the voice recognition server. Accordingly, the user information can be shared.

The registration session procedure may be the same as the registration session procedure of the UAS described in FIG. 12. The user device may be assigned a registration ID through the registration session procedure.

The user device may be assigned an authority capable of controlling a target device through the registration session procedure.

Specifically, the user device may be assigned an authority capable of controlling all the transactions of a target device or only some operations of a target device based on the user information.

For example, if the user's authority assigned based on the user information is a guest authority, the user device may control only some operations of a target device and cannot control the remaining operations. In this case, if the user device indicates a target operation that cannot be controlled with respect to the gateway, the gateway may transmit, to the user device, an error message including a cause indicating that the user's authority is an authority incapable of controlling the target device. The user device may display the error cause on a display unit.

If the user's authority assigned based on the user information is an administrator authority, however, the user device may control all the transactions of the target device.

When a voice is received from a user, the user device may open an audio channel for transmitting and receiving voice signals to and from the gateway.

Specifically, before the user device opens an audio channel with the gateway, the user device may identify whether the user device and the gateway are registered devices through a secure session procedure, and may establish a secure link (S20030).

In this case, the secure session procedure may be the same as the registration session procedure of the UAS described in FIG. 12.

Thereafter, the user device may open an audio channel for transmitting and receiving voice signals to and from the gateway, and may transmit and receive voice signals.

Through such a method, a gateway and a user device can be registered and establish an authentication and secure link.

Figure 21:
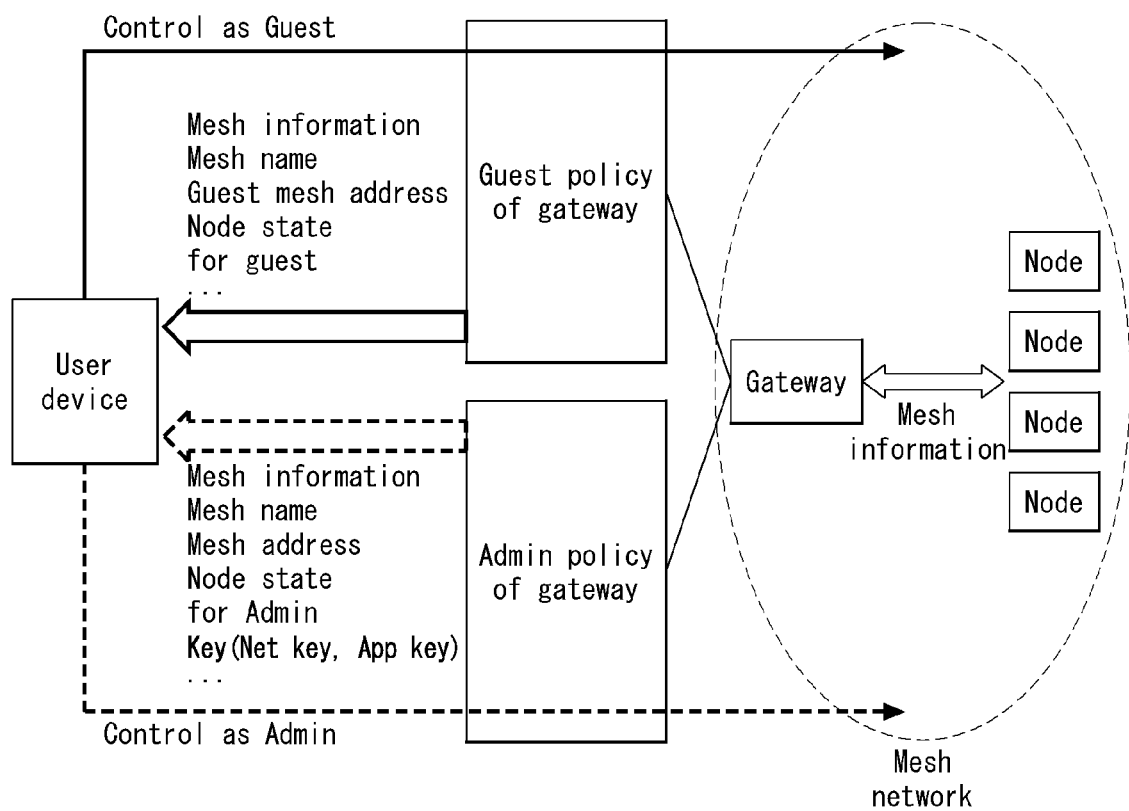
FIG. 21 shows an example of a policy for controlling a device according to a user's authority according to an embodiment of the present invention.

FIG. 21 shows an example of a policy for controlling a device according to a user's authority according to an embodiment of the present invention.

Referring to FIG. 21, different policies for controlling a target device according to an authority assigned based on user information may be applied to a user device.

A guest authority and an administrator authority are described below as examples of an authority based on user information.

If a plurality of target devices configures a mesh network through BLE, a user device may control the plurality of target devices according to a policy assigned by a gateway.

If the assigned authority is a guest authority, a guest policy may be applied to the user device. If the assigned authority is an administrator authority, an administrator policy may be applied to the user device.

Each policy is as follows.

Guest policy: policy applied to a user device that is determined to be a guest by a gateway and indicate controllable operations of devices forming a mesh network through a guest authority. Furthermore, this includes a method of delivering mesh information of a mesh network to a user device and a method for a user device having a guest authority to deliver a command for controlling operations to devices configuring a mesh network.

Administrator policy (Admin policy): policy applied to a user device that is determined to be a guest by a gateway and indicate controllable operations of devices configuring a mesh network through an administrator authority. Furthermore, this includes a method of delivering mesh information of a mesh network to a user device and a method for a user device having an administrator authority to deliver a command for controlling operations to devices configuring a mesh network.

For example, as shown in FIG. 21, if a guest policy is applied to the user device, the user device may obtain mesh information of a mesh network for a user device having a guest authority.

The mesh information for the guest authority may include a mesh name for identifying the mesh network, a mesh network ID, a guest mesh address indicative of an address to be used in the mesh network by the user device, and state information indicative of the state of each node.

If an administrator policy is applied to the user device, the user device may obtain mesh information of a mesh network for a user device having an administrator authority.

The mesh information for the administrator authority may include a mesh name for identifying the mesh network, a mesh network ID, a guest mesh address indicative of an address to be used in the mesh network by the user device, state information indicative of the state of each node, and a key (e.g., net key, app key) for security.

The administrator authority and the guest authority described in the present embodiment show examples of an authority which may be applied to a user device. Various authorities for controlling a target device may be present.

Figure 22:
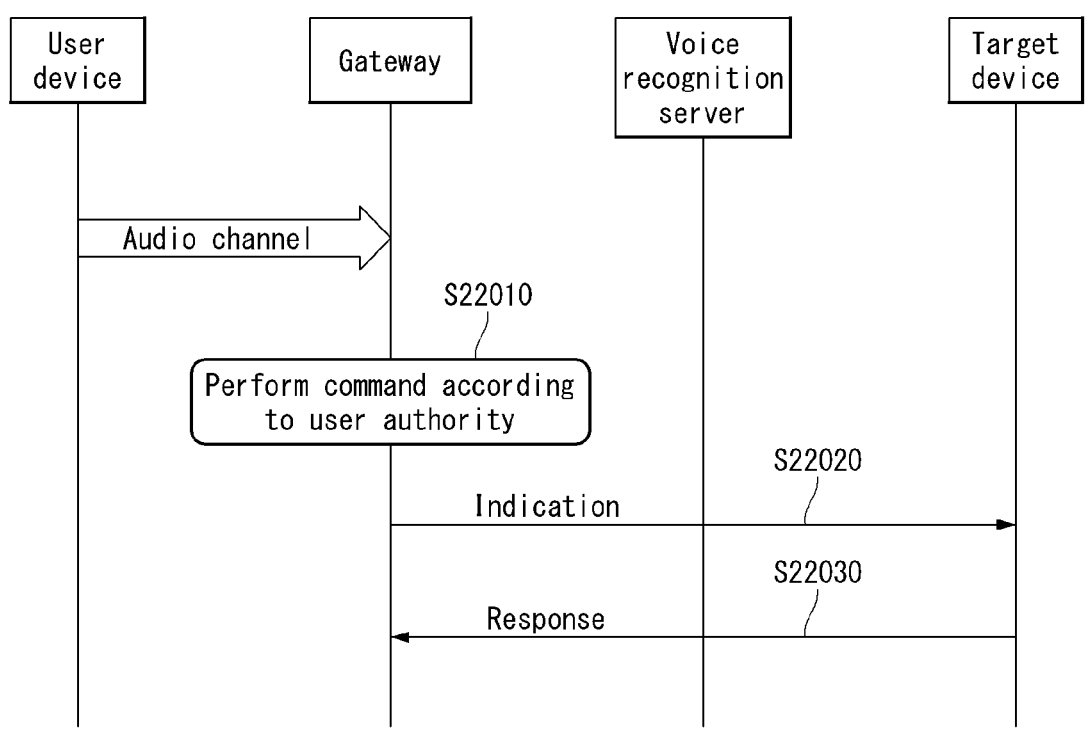
FIG. 22 is a flowchart showing an example of a method of controlling a device according to a user's authority according to an embodiment of the present invention.

FIG. 22 is a flowchart showing an example of a method of controlling a device according to a user's authority according to an embodiment of the present invention.

Referring to FIG. 22, a user device transmits a voice signal for controlling a target device to a gateway through an audio channel. The gateway may control the target device according to the authority of the user device based on the received voice signal.

Specifically, the user device that has opened a registration and audio channel through the methods described in FIGS. 17 to 20 converts a voice, received from a user, into a voice signal, and transmits the voice signal to the gateway.

In this case, the user device may transmit user information to the gateway through a data channel so that the gateway can determine the authority of the user device.

If the gateway can directly interpret and process the voice signal, it may interpret and process the voice signal received from the user device, and may recognize an operation of a target device to be controlled.

If the gateway cannot directly interpret and process the voice signal, the gateway may recognize a specific operation of a target device to be controlled through a voice recognition server using the method described in FIG. 17.

The gateway may recognize the authority and applicable policy of the user device based on the user information, and may determine whether the user device can control a specific operation of the target device based on the recognized authority and applicable policy.

If the user device has an authority incapable of controlling a specific operation, the gateway may transmit, to the user device, an error message including a cause indicating that the authority is an authority incapable of controlling the target device. The user device may display the error cause on a display unit.

If the user device has an authority capable of controlling a specific operation, however, the gateway may transmit an indication message indicative of the specific operation to the target device, and may receive a response message as a response thereto (S22020, S22030).

In this case, the response message may include a result code indicating whether the specific operation has been performed. If the target device has successfully performed the specific operation, the result code may indicate a success in the execution of the specific operation.

If the target device fails in executing the specific operation, however, the result code may indicate a failure in the execution of the specific operation. In this case, the response message may further include a cause field indicative of a failure cause.

Figure 23:
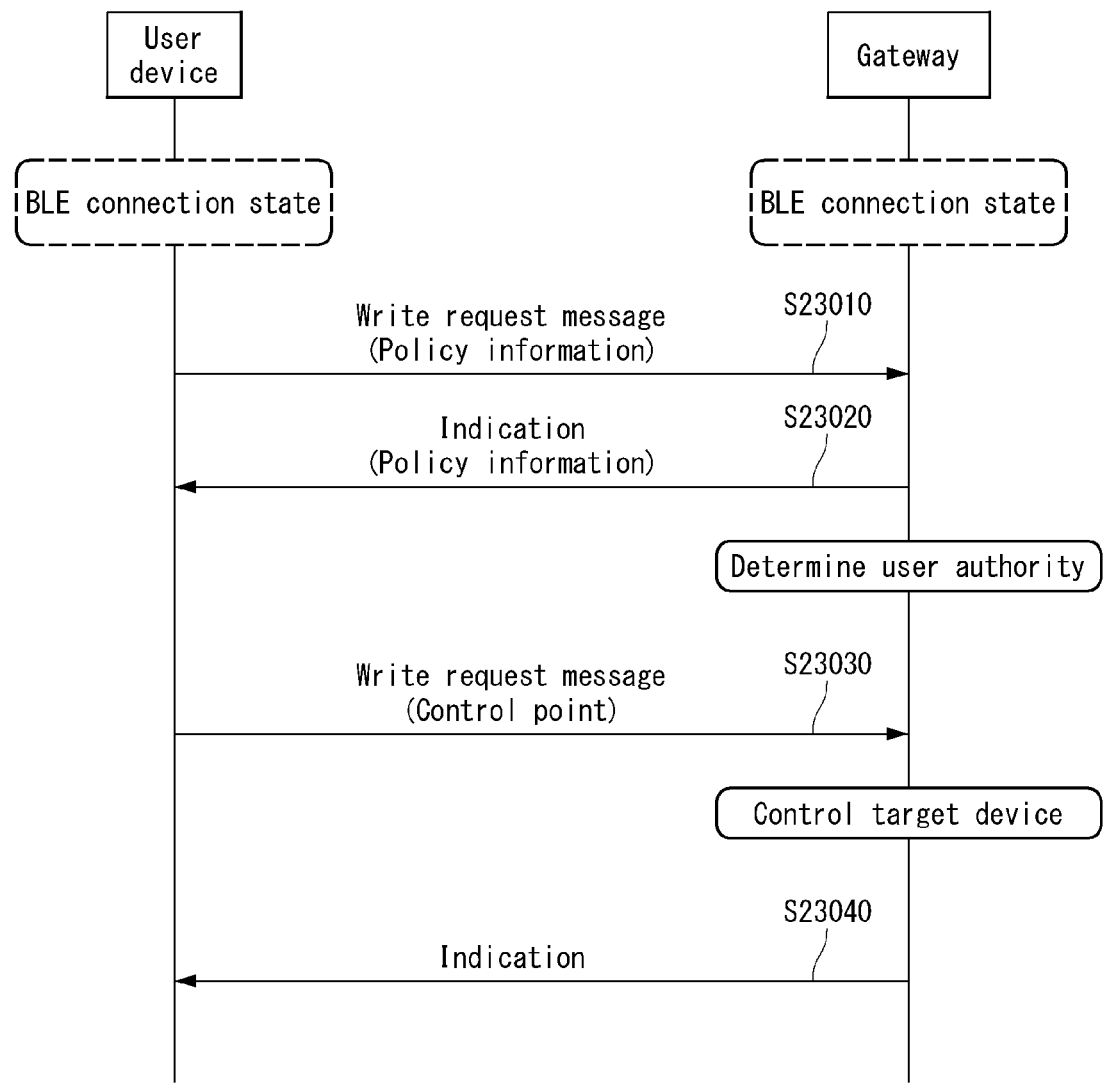
FIG. 23 is a flowchart showing an example of a method of controlling a target device through a gateway according to a user's authority according to an embodiment of the present invention.

FIG. 23 is a flowchart showing an example of a method of controlling a target device through a gateway according to a user's authority according to an embodiment of the present invention.

Referring to FIG. 23, a user device may control a target device directly or indirectly according to an assigned authority.

Specifically, the user device may be registered with a gateway and a voice recognition server through the methods described in FIGS. 17 to 22, and may be assigned an authority for controlling a target device.

Furthermore, the user device may open an audio channel for transmitting and receiving voice signals to and from the gateway. Target devices may have configured a mesh network.

If an authority assigned to the user device is an authority (e.g., administrator authority) capable of controlling all the transactions of a target device, the user device may obtain security information (e.g., net key, app key) of the target device from the gateway, and may directly control the target device.

If the authority assigned to the user device is an authority (e.g., guest authority) capable of controlling only some operations of target devices and incapable of controlling some operations, however, the user device may obtain policy information indicative of operations that may be controlled and information of the target devices that may be obtained from the gateway according to the assigned authority, and may control the target devices.

Specifically, as shown in FIG. 23, if a BLE connection has been established between the user device and the gateway, the user device transmits, to the gateway, a write request message (or read request message) that requests policy information included in the policy information characteristic of the gateway (S23010).

In this case, the write request message may include a user ID for identifying the user device.

The gateway may determine the authority of the user device based on the user ID included in the write request message, and may transmit, to the user device, policy information indicative of a policy applied to the authority of the user device through an indication message (S23020).

The user device may recognize information of target devices that may be obtained and operations of the target devices that may be controlled, based on the policy information obtained from the gateway.

Thereafter, the user device transmits, to the gateway, a write request message that requests the writing of a control point characteristic for controlling operations of the target devices based on the policy information (S23030).

The user device may control the target devices through the gateway using the control point characteristic.

The gateway writes the control point characteristic, and may control the target devices configuring a mesh network using the methods described in FIGS. 17, 21 and 22.

Thereafter, the gateway may transmit, to the user device, an indication message indicating whether an operation of a target device has been performed (S23040).

In this case, the indication message may include a result code indicating whether the target device has performed a specific operation. If the target device has successfully performed the specific operation, the result code may indicate a success in the execution of the specific operation.

If the target device has failed in performing the specific operation, however, the result code may indicate a failure in the execution of the specific operation. In this case, the response message may further include a cause field indicative of a failure cause.

If a result of the execution of the specific operation requires output, such as a voice signal, the user device displays the result of the execution of the specific operation on a display unit (e.g., display or speaker).

For example, when a user requests "weather in a specific area" from the user device, the user device may display "weather in a specific area", received from the gateway, on the display unit.

Figure 24:
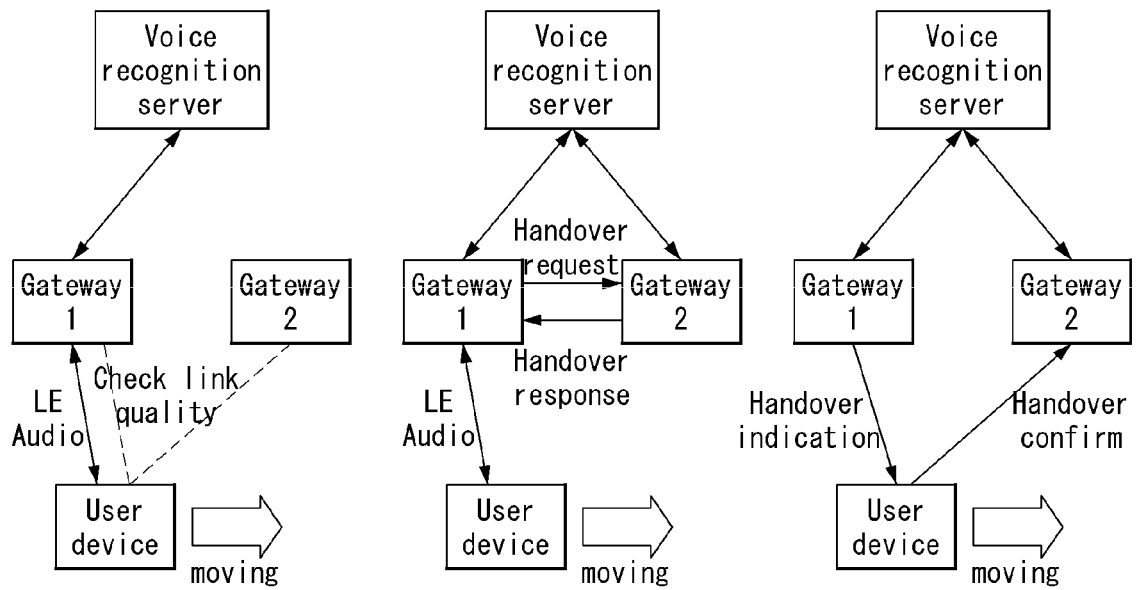
FIG. 24 shows an example of a handover method according to an embodiment of the present invention.

FIG. 24 shows an example of a handover method according to an embodiment of the present invention.

Referring to FIG. 24, if a user device moves to the distance where it cannot communicate with a gateway, it may continue to provide service by performing another gateway handover.

Specifically, (a) if a user device transmits and receives audio signals to and from a gateway 1 through an audio channel of BLE, the user device may check link quality of adjacent gateways periodically or aperiodically and report it to the gateway 1.

(b) If link quality with the gateway 1 is not sufficient to transmit and receive audio signals due to a movement of the user device, a specific gateway of other adjacent gateways may be selected and handover of the user device may be determined. For example, when link quality between the gateway 1 and the user device is a specific threshold or less, the gateway 1 may select a gateway 2 having the highest link quality among other adjacent gateways, and may determine the handover.

Thereafter, the gateway 1 may transmit, to the gateway 2, a request message that requests the handover of the user device, and may receive a handover response message as a response thereto.

(c) The gateway 1 transmits, to the user device, an indication message indicative of handover to the gateway 2.

The user device performs handover to the gateway 2 and transmits a handover confirm message to the gateway 2 in order to notify the gateway 2 that the handover has been completed.

(d) Thereafter, the gateway 2 transmits, to the gateway 1, the release request of an audio channel between the gateway 1 and the user device and a release message in order to notify the gateway 1 that the handover of the user device has been completed.

(e) The gateway 1 releases the audio channel with the user device. The user device may continue to provide service for controlling target devices through voice recognition through an audio channel open between the user device and the gateway 2 through the handover.

Through such a method, although a user device continues to move, it can continue to provide service through BLE without interrupting the service.

Figure 25:
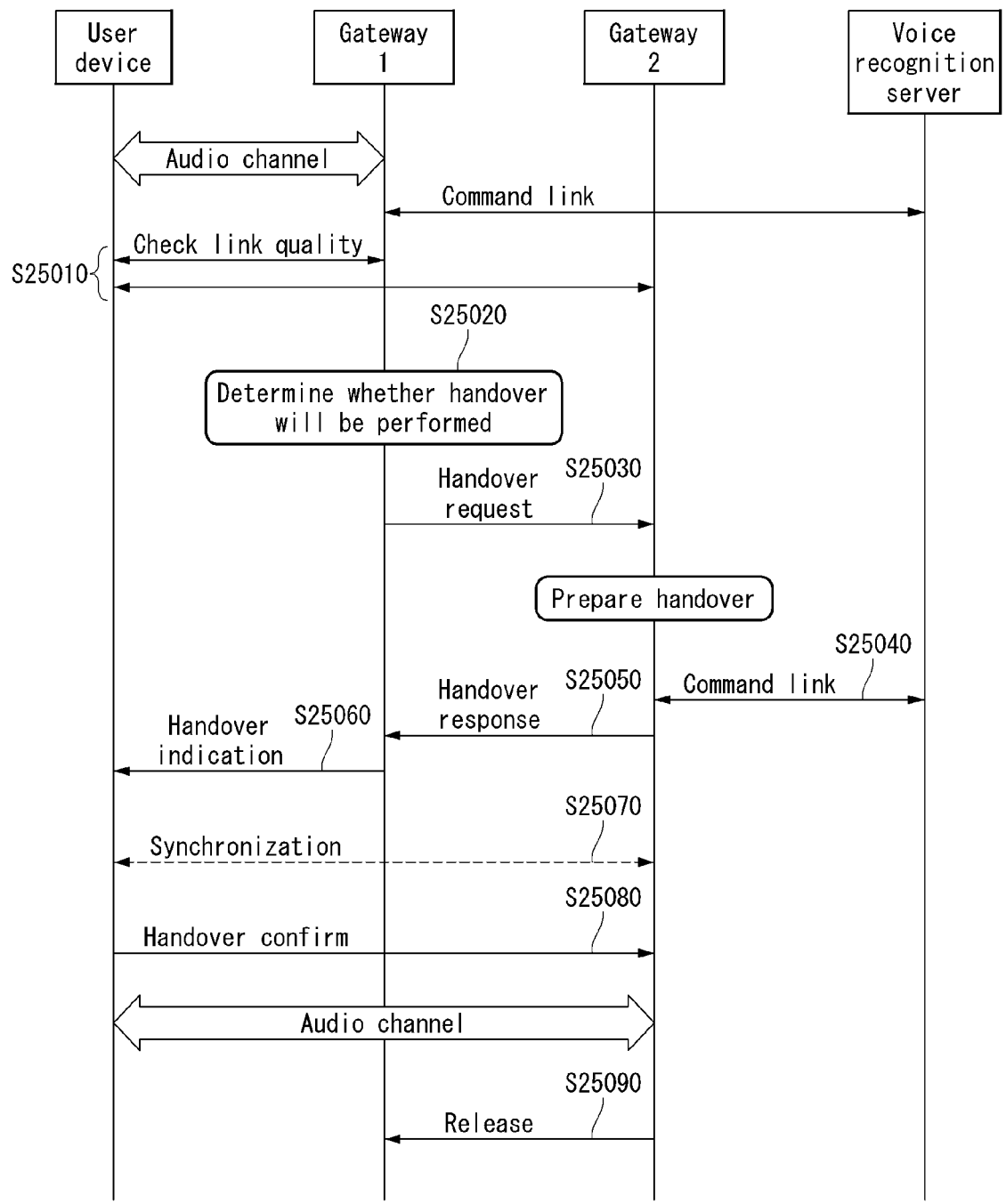
FIG. 25 is a flowchart showing an example of a handover method according to an embodiment of the present invention.

FIG. 25 is a flowchart showing an example of a handover method according to an embodiment of the present invention.

Referring to FIG. 25, if link quality between a user device and a gateway is not suitable for transmitting and receiving audio signals, the user device may continue to provide service by transmitting and receiving audio signals to and from another gateway through handover.

Specifically, the user device may transmit and receive voice signals to and from a gateway 1 through an audio channel.

The gateway 1 may transmit, to a voice recognition server, a voice signal received from the user device and user information through a command link, and may obtain control information for controlling a target device based on the voice signal through the command link from the voice recognition server.

The user device may check link quality (e.g., received signal intensity) with the gateway 1 and adjacent gateways periodically or aperiodically (S25010).

For example, the user device may measure link quality with the gateway 1 and a gateway 2 periodically or aperiodically, and may report a measured value to the gateway 1.

The gateway 1 may determine whether handover of the user device needs to be performed based on the link quality received from the user device (S25020).

For example, if the link quality between the user device and the gateway 1 is not sufficient for transmitting and receiving voice signals due to a cause, such as a movement of the user device (e.g., when the link quality is a specific threshold or less), the gateway 1 may select a gateway (hereinafter gateway 2) having the best link quality among adjacent gateways, and may determine the handover of the user device to the selected gateway 2.

The gateway 1 transmits, to the selected gateway 2, a handover request message that requests the handover of the user device (S25030).

The handover request message may include the same information as user information exchanged in the registration session described in FIG. 17. That is, the handover request message may include a user name for identifying a user who uses the user device, a user ID, list information indicative of a list of gateways previously used by the user device, and security information.

The security information may include values exchanged in the registration session described in FIG. 12, such as the public key of the user device.

The gateway 2 that has received the handover request message from the gateway 1 determines whether or not to grant the handover of the user device.

If the gateway 2 does not grant the handover of the user device, it transmits, to the gateway 1, a message indicative of handover impossibility.

If the gateway 2 grants the handover of the user device, however, the gateway 2 makes preparation for the handover.

Specifically, the gateway 2 forms a command link for transmitting the voice signal and user information, obtained from the user device, to the voice recognition server and for obtaining control information for controlling a target device from the voice recognition server based on the voice signal (S25040).

Thereafter, the gateway 2 transmits, to the gateway 1, a handover response message as a response to the handover request message.

The gateway 2 may notify the gateway 1 of the grant of handover and the completion of the handover preparation through the handover response message (S25050).

The gateway 1 transmits, to the user device, an indication message indicative of the handover to the gateway 2.

The user device may perform the handover to the gateway 2. For example, the user device may be synchronized with the gateway 2 through synchronization with the gateway 2 in order to open an audio channel for transmitting and receiving voice signals (S25070).

The user device synchronized with the gateway 2 through the synchronization transmits a handover confirm message indicative of the completion of the handover to the gateway 2, and opens an audio channel with the gateway 2 (S25080).

Thereafter, the gateway 2 transmits, to the gateway 1, a release request for an audio channel between the gateway 1 and the user device and a release message in order to notify the gateway 1 that the handover of the user device has been completed (S25090).

The gateway 1 that has received the release message from the gateway 2 releases the audio channel with the user device. The user device may continue to provide service for controlling target devices recognized through voice recognition through the audio channel open between the user device and the gateway 2 through the handover.

Figure 26:
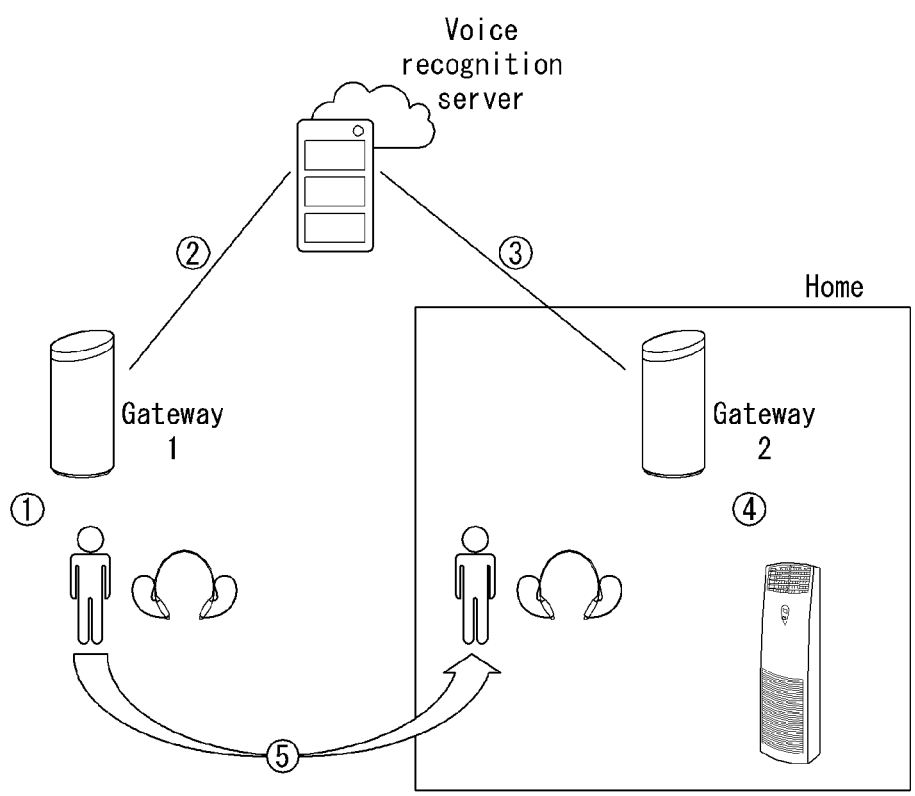
FIG. 26 shows an example of a user scenario for controlling a target device according to an embodiment of the present invention.

FIG. 26 shows an example of a user scenario for controlling a target device according to an embodiment of the present invention.

Referring to FIG. 26, a user may control devices within a home on the outside using a user device.

Specifically, ① the user inputs a voice for controlling a specific operation of target devices within the home on the outside using the user device. For example, the user inputs, to a headset, a voice indicating that an air cleaner needs to be powered ON and to be controlled to a temperature of 20 degrees. The user device converts the input voice into a voice signal and transmits it to an adjacent gateway 1 through an audio channel.

In this case, the user device may transmit, to the gateway 1, user information for identifying the user through a data channel.

② The gateway 1 may notify a voice recognition server that the voice for controlling devices within the home has been input by the user by transmitting the received voice signal and user information to the voice recognition server.

In this case, the user device and the gateway 1 may transmit and receive voice signals and data through Bluetooth LE. The gateway 1 and the voice recognition server may transmit and receive voice signals and data using remote distance wireless communication means (e.g., Wi-Fi, LTE, or LTE-A).

③ The voice recognition server may transmit, to a gateway 2 within the home, control information for controlling a specific operation of the target devices and the user information.

④ The gateway 2 may identify the user who tries to control the target devices based on the user information, and may control the target devices so that they perform the specific operation based on the control information.

For example, the gateway 2 may turn on the air cleaner, and may control the air-conditioner and/or a fan heater so that a temperature within the home becomes 20 degrees.

In this case, the gateway 2 and the voice recognition server may transmit and receive voice signals and data using remote distance wireless communication means (e.g., Wi-Fi, LTE, or LTE-A). The gateway 2 may control the target devices through Bluetooth LE.

⑤ Thereafter, when the user enters the home, the user may identify that the operation indicated through the voice through the user device has been performed.

Through such a method, a user device can control target devices at a remote place through a gateway and a voice recognition server.

Figure 27:
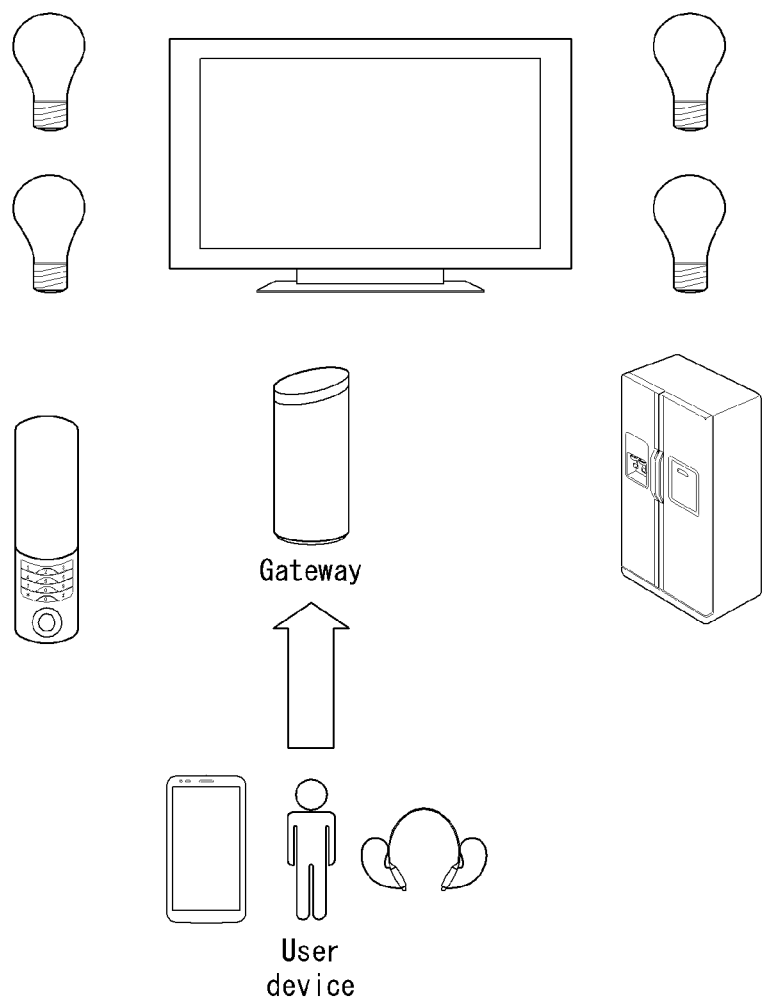
FIG. 27 shows an example of a user scenario for obtaining information of devices configuring a network according to an embodiment of the present invention.

FIG. 27 shows an example of a user scenario for obtaining information of devices configuring a network according to an embodiment of the present invention.

Referring to FIG. 27, when a user device participates in a mesh network configured with a plurality of target devices, it may obtain mesh information related to the target devices configuring the mesh network according to a user's authority, and a controllable operation may be limited.

Specifically, when the user device is first registered with a gateway through a registration session procedure as described above in FIGS. 20 and 21, it may be assigned a control authority based on user information.

Thereafter, when the user device participates in a mesh network configured with a plurality of target devices, it may obtain policy information, including operation information indicative of operations that may be controlled according to an authority assigned based on a control authority assigned by the gateway and mesh information indicative of information of target devices that may be obtained, as described above in FIG. 21.

The user device may identify the state of each of the target devices configuring the mesh network based on the obtained policy information, and may control each of the target devices configuring the mesh network so that each target device performs a specific operation based on the obtained policy information.

Furthermore, the drawings have been divided and described for convenience of description, but the embodiments described in the drawings may be designed to be merged to implement a new embodiment. Furthermore, the range of right of the present invention also includes designing a computer-readable recording medium in which a program for executing the above-described embodiments has been written according to the needs of those skilled in the art.

The orientation-based device search method according to this specification is not limited and applied to the elements and methods according to the above-described embodiments, and some of or all the above-described embodiments may be selectively combined and configured so that the embodiments are modified in various manners.

Meanwhile, the orientation-based device search method of this specification may be implemented in a processor-readable recording medium included in a network device, in the form of processor-readable code. The processor-readable recording medium includes all types of recording devices in which data readable by a processor is stored. The processor-readable recording medium may include ROM, RAM, CD-ROM, magnetic tapes, floppy disks, and optical data storage devices, for example. Furthermore, the processor-readable recording medium may be implemented in the form of carrier waves, such as transmission through the Internet. Furthermore, the processor-readable recording medium may be distributed to computer systems connected over a network, and the processor-readable code may be stored and executed in a distributed manner.

Furthermore, although the preferred embodiments of this specification have been illustrated and described above, this specification is not limited to the above-described specific embodiments, and a person having ordinary skill in the art to which the present invention pertains may modify the present invention in various ways without departing from the gist of the present invention in the claims. Such modified embodiments should not be individually understood from the technical spirit or prospect of the present invention.

Furthermore, in this specification, both the apparatus invention and the method invention have been described, but the descriptions of both the inventions may be complementally applied, if necessary.

INDUSTRIAL APPLICABILITY

The data transmission and reception method of the present invention have been described based on an example in which they are applied to Bluetooth LE, but may be applied to various wireless communication systems in addition to the Bluetooth LE system.

The invention claimed is:

1. A method of controlling a target device by a user device using a Bluetooth low energy technology in a wireless communication system, the method comprising:
discovering a first gateway for controlling at least one target device through a voice signal;
receiving, from a user, a first voice signal for controlling the at least one target device;
transmitting, to the discovered first gateway, user information for identifying the user and the first voice signal, wherein the user information is transmitted through a data channel for transmitting and receiving data and the voice signal is transmitted through a first isochronous channel for transmitting and receiving audio signals;
receiving, from the first gateway, data indicating a result of control of the first voice signal or a second voice signal;
checking link quality of the first gateway and a second gateway;
receiving, from the first gateway, an indication message indicating handover to the second gateway based on the link quality;
synchronizing the second gateway in order to form a second isochronous channel with the second gateway;
transmitting, to the second gateway, a confirm message in order to indicate that the second gateway has been synchronized; and
opening the second isochronous channel with the second gateway.

2. The method of claim 1,
wherein the discovering the first gateway comprises:
receiving an advertising message from at least one adjacent gateway;
transmitting, to the first gateway supporting voice recognition among the at least one adjacent gateway, a request message to request control of a target device through a voice signal based on the advertising message; and
opening the first isochronous channel with the first gateway, and
wherein the advertising message comprises a specific field indicating whether the at least one adjacent gateway supports voice recognition.

3. The method of claim 1,
wherein the discovering the first gateway comprises:
broadcasting a request message to request control of a target device through a voice signal;
receiving a response message as a response to the request message from the first gateway; and
opening the first isochronous channel with the first gateway.

4. The method of claim 1, further comprising:
registering the user device with the first gateway; and
transmitting, to the first gateway, the user information comprising a user name.

5. The method of claim 1, further comprising:
receiving, from the first gateway, a message comprising at least one of group information of a group formed by the at least one target device, a group name, a group address, state information indicating a state of each target device, or security information according to a control authority of the user device.

6. The method of claim 1, further comprising:
transmitting, to the first gateway, a request message to request policy information according to a control authority of the user device; and
receiving, from the first gateway, a response message comprising the policy information,
wherein the policy information indicates a control range of the at least one target device according to the control authority.

7. A method of delivering a voice signal by a gateway using a Bluetooth low energy technology in a wireless communication system, the method comprising:
performing a discovery procedure for discovering the gateway by a user device;
receiving, from the user device, user information for identifying a user and a first voice signal for controlling at least one target device, wherein the user information is received through a data channel for transmitting and receiving data and the voice signal is received through a first isochronous channel for transmitting and receiving audio signals;
transmitting the user information and the first voice signal to a voice recognition server capable of processing a voice signal;
receiving, from the voice recognition server, control information indicating a specific operation corresponding to the first voice signal and authority information indicating a user authority corresponding to the user information; information; and
determining whether to indicate the specific operation with respect to the at least one target device based on the authority information;
checking link quality between the user device and the gateway;
determining handover of the user device to a target gateway based on the link quality;
transmitting, to the target gateway, a handover request message to request the handover of the user device, wherein the handover request message comprises at least one of gateway information indicating at least one gateway used by the user device or security information of the user device;
receiving, from the target gateway, a handover response message as a response to the handover request message;
transmitting, to the user device, an indication message indicating the handover to the target gateway; and
receiving, from the target gateway, a release message indicating a completion of the handover.

8. The method of claim 7, further comprising:
transmitting, to the user device, a notification message indicating control impossibility when the authority information indicates an authority incapable of indicating the specific operation.

9. The method of claim 7, further comprising:
transmitting, to the at least one target device, a request message to request the specific operation when the authority information indicates an authority capable of indicating the specific operation;
receiving, from the at least one target device, a response message indicating a result of execution of the specific operation; and
transmitting, to the user device, data indicating a result of the first voice signal or a second voice signal.

10. The method of claim 9, further comprising:
transmitting, to the user device, time information indicating an estimated operation time of the at least one target device for the specific operation.

11. The method of claim 7, further comprising:
registering the gateway with the voice recognition server;
registering the user device with the gateway;
receiving, from the user device, the user information comprising a user name; and
transmitting the user information to the voice recognition server.

12. A user device for controlling a target device using a Bluetooth low energy technology in a wireless communication system, the user device comprising:
a communication unit configured to communicate with at least one external device in a wired or wireless manner; and
a processor functionally connected to the communication unit,
wherein the processor is configured to:
discover a first gateway for controlling at least one target device through a voice signal;
receive, from a user, a first voice signal for controlling the at least one target device;
transmit, to the discovered first gateway, user information for identifying the user and the first voice signal, wherein the user information is transmitted through a data channel for transmitting and receiving data and the voice signal is transmitted through a first isochronous channel for transmitting and receiving audio signals;
receive, from the first gateway, data indicating a result of control of the first voice signal or a second voice signal;
check link quality of the first gateway and a second gateway;
receive, from the first gateway, an indication message indicating handover to the second gateway based on the link quality;
synchronize the second gateway in order to form a second isochronous channel with the second gateway;
transmit, to the second gateway, a confirm message in order to indicate that the second gateway has been synchronized; and
open the second isochronous channel with the second gateway.

13. The user device of claim 12,
wherein the processor is configured to:
receive an advertising message from at least one adjacent gateway;
transmit, to the first gateway supporting voice recognition among the at least one adjacent gateway, a request message to request control of a target device through a voice signal based on the advertising message; and
open the first isochronous channel with the first gateway, and
wherein the advertising message comprises a specific field indicating whether the at least one adjacent gateway supports voice recognition.

14. The user device of claim 12,
wherein the processor is configured to:
broadcast a request message to request control of a target device through a voice signal;
receive a response message as a response to the request message from the first gateway; and
open the first isochronous channel with the first gateway.

15. The user device of claim 12,
wherein the processor is configured to:
register the user device with the first gateway; and
transmit, to the first gateway, the user information comprising a user name.

16. The user device of claim 12,
wherein the processor is configured to:
receive, from the first gateway, a message comprising at least one of group information of a group formed by the at least one target device, a group name, a group address, state information indicating a state of each target device, or security information according to a control authority of the user device.

17. The user device of claim 12,
wherein the processor is configured to:
transmit, to the first gateway, a request message to request policy information according to a control authority of the user device; and
receive, from the first gateway, a response message comprising the policy information, and
wherein the policy information indicates a control range of the at least one target device according to the control authority.

* * * * *